(12) United States Patent
Balasubramanian et al.

(10) Patent No.: US 12,376,066 B2
(45) Date of Patent: Jul. 29, 2025

(54) USER EQUIPMENT POSITIONING

(71) Applicant: QUALCOMM Incorporated, San Diego, CA (US)

(72) Inventors: Anantharaman Balasubramanian, San Diego, CA (US); Hong Cheng, Basking Ridge, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/053,913

(22) Filed: Nov. 9, 2022

(65) Prior Publication Data

US 2024/0155349 A1    May 9, 2024

(51) Int. Cl.
*H04W 4/029* (2018.01)
*H04W 8/00* (2009.01)
(Continued)

(52) U.S. Cl.
CPC ........... *H04W 64/00* (2013.01); *H04W 4/029* (2018.02); *H04W 8/005* (2013.01); *H04W 12/03* (2021.01); *H04W 12/0431* (2021.01); *H04W 12/63* (2021.01); *H04W 12/72* (2021.01); *H04W 12/73* (2021.01); *H04W 24/10* (2013.01); *H04W 64/003* (2013.01); *H04W 64/006* (2013.01); *H04W 84/02* (2013.01); *H04W 88/02* (2013.01); *H04W 88/085* (2013.01);
(Continued)

(58) Field of Classification Search
CPC ....... H04W 4/02–90; H04W 8/005–30; H04W 12/009–80; H04W 24/02–10; H04W 48/02–20; H04W 64/00–006; H04W 76/10–50; H04W 84/005–22; H04W 88/005–188; H04W 92/02–24
See application file for complete search history.

(56) References Cited

U.S. PATENT DOCUMENTS

2013/0099896 A1*   4/2013   Arkko ................... H04W 64/00

FOREIGN PATENT DOCUMENTS

WO    WO-2022010910 A1 *   1/2022   ............ H04W 64/00

OTHER PUBLICATIONS

3GPP TR 33.893: "3rd Generation Partnership Project; Technical Specification Group Services and System Aspects; Study on Security Aspects of Ranging Based Services and Sidelink Positioning (Release 18)", V0.3.0, Oct. 24, 2022. (Year: 2022).*

(Continued)

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment (UE) may receive, from a central network node, configuration information for reporting UE positioning information or distributed network node positioning information. The UE may identify one or more distributed network nodes based at least in part on respective connections between the one or more distributed network nodes and the UE or based at least in part on measurement information. The UE may obtain one or more encrypted identifiers respectively associated with the one or more distributed network nodes. The UE may transmit, to the central network node, the one or more encrypted identifiers in accordance with the configuration information. Numerous other aspects are described.

30 Claims, 12 Drawing Sheets

(51) Int. Cl.
| | |
|---|---|
| *H04W 12/03* | (2021.01) |
| *H04W 12/0431* | (2021.01) |
| *H04W 12/63* | (2021.01) |
| *H04W 12/72* | (2021.01) |
| *H04W 12/73* | (2021.01) |
| *H04W 24/10* | (2009.01) |
| *H04W 64/00* | (2009.01) |
| *H04W 84/02* | (2009.01) |
| *H04W 88/02* | (2009.01) |
| *H04W 88/08* | (2009.01) |
| *H04W 88/12* | (2009.01) |
| *H04W 88/18* | (2009.01) |
| *H04W 92/02* | (2009.01) |
| *H04W 92/10* | (2009.01) |
| *H04W 92/12* | (2009.01) |

(52) U.S. Cl.
CPC ............ *H04W 88/12* (2013.01); *H04W 88/18* (2013.01); *H04W 92/02* (2013.01); *H04W 92/10* (2013.01); *H04W 92/12* (2013.01)

(56) References Cited

OTHER PUBLICATIONS

3GPP TR 33.893: "3rd Generation Partnership Project; Technical Specification Group Services and System Aspects; Study on Security Aspects of Ranging Based Services and Sidelink Positioning (Release 18)", 3rd Generation Partnership Project, Mobile Competence Centre, 650, Route Des Lucioles, F-06921 Sophia-Antipolis Cedex, France, No. V0.3.0, Oct. 24, 2022, 32 Pages, XP052211760, figures 6.5.2-1, 5.3.2, 6.2.2, 6.5.2.1, 6.6.2.
International Search Report and Written Opinion—PCT/US2023/077552—ISA/EPO—Jan. 5, 2024.

* cited by examiner

USER EQUIPMENT POSITIONING

FIELD OF THE DISCLOSURE

Aspects of the present disclosure generally relate to wireless communication and to techniques and apparatuses for user equipment positioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a central network node, configuration information for reporting UE positioning information or distributed network node positioning information. The method may include identifying one or more distributed network nodes based at least in part on respective connections between the one or more distributed network nodes and the UE or based at least in part on measurement information. The method may include obtaining one or more encrypted identifiers respectively associated with the one or more distributed network nodes. The method may include transmitting, to the central network node, the one or more encrypted identifiers in accordance with the configuration information.

Some aspects described herein relate to a method of wireless communication performed by a distributed network node. The method may include receiving, from a central network node, configuration information for reporting UE positioning information or distributed network node positioning information. The method may include identifying one or more UEs based at least in part on respective connections between the one or more UEs and the distributed network node or based at least in part on measurement information. The method may include obtaining one or more encrypted identifiers respectively associated with the one or more UEs. The method may include transmitting, to the central network node, the one or more encrypted identifiers in accordance with the configuration information.

Some aspects described herein relate to an apparatus for wireless communication performed by a UE. The apparatus may include a memory and one or more processors, coupled to the memory. The one or more processors may be configured to receive, from a central network node, configuration information for reporting UE positioning information or distributed network node positioning information. The one or more processors may be configured to identify one or more distributed network nodes based at least in part on respective connections between the one or more distributed network nodes and the UE or based at least in part on measurement information. The one or more processors may be configured to obtain one or more encrypted identifiers respectively associated with the one or more distributed network nodes. The one or more processors may be configured to transmit, to the central network node, the one or more encrypted identifiers in accordance with the configuration information.

Some aspects described herein relate to an apparatus for wireless communication performed by a network node. The apparatus may include a memory and one or more processors, coupled to the memory. The one or more processors may be configured to receive, from a central network node, configuration information for reporting UE positioning information or distributed network node positioning information. The one or more processors may be configured to identify one or more UEs based at least in part on respective connections between the one or more UEs and the distributed network node or based at least in part on measurement information. The one or more processors may be configured to obtain one or more encrypted identifiers respectively associated with the one or more UEs. The one or more processors may be configured to transmit, to the central network node, the one or more encrypted identifiers in accordance with the configuration information.

Some aspects described herein relate to a non-transitory computer-readable medium that stores a set of instructions for wireless communication by a UE. The set of instructions, when executed by one or more processors of the UE, may cause the UE to receive, from a central network node, configuration information for reporting UE positioning information or distributed network node positioning information. The set of instructions, when executed by one or more processors of the UE, may cause the UE to identify one or more distributed network nodes based at least in part on respective connections between the one or more distributed network nodes and the UE or based at least in part on measurement information. The set of instructions, when executed by one or more processors of the UE, may cause the UE to obtain one or more encrypted identifiers respectively associated with the one or more distributed network nodes. The set of instructions, when executed by one or more processors of the UE, may cause the UE to transmit, to the central network node, the one or more encrypted identifiers in accordance with the configuration information.

Some aspects described herein relate to a non-transitory computer-readable medium that stores a set of instructions for wireless communication by a distributed network node. The set of instructions, when executed by one or more processors of the distributed network node, may cause the distributed network node to receive, from a central network node, configuration information for reporting UE positioning information or distributed network node positioning information. The set of instructions, when executed by one or more processors of the distributed network node, may cause the distributed network node to identify one or more UEs based at least in part on respective connections between the one or more UEs and the distributed network node or based at least in part on measurement information. The set of instructions, when executed by one or more processors of the distributed network node, may cause the distributed network node to obtain one or more encrypted identifiers respectively associated with the one or more UEs. The set of instructions, when executed by one or more processors of the distributed network node, may cause the distributed network node to transmit, to the central network node, the one or more encrypted identifiers in accordance with the configuration information.

Some aspects described herein relate to an apparatus for wireless communication. The apparatus may include means for receiving, from a central network node, configuration information for reporting UE positioning information or distributed network node positioning information. The apparatus may include means for identifying one or more distributed network nodes based at least in part on respective connections between the one or more distributed network nodes and the UE or based at least in part on measurement information. The apparatus may include means for obtaining one or more encrypted identifiers respectively associated with the one or more distributed network nodes. The apparatus may include means for transmitting, to the central network node, the one or more encrypted identifiers in accordance with the configuration information.

Some aspects described herein relate to an apparatus for wireless communication. The apparatus may include means for receiving, from a central network node, configuration information for reporting UE positioning information or distributed network node positioning information. The apparatus may include means for identifying one or more UEs based at least in part on respective connections between the one or more UEs and the distributed network node or based at least in part on measurement information. The apparatus may include means for obtaining one or more encrypted identifiers respectively associated with the one or more UEs. The apparatus may include means for transmitting, to the central network node, the one or more encrypted identifiers in accordance with the configuration information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
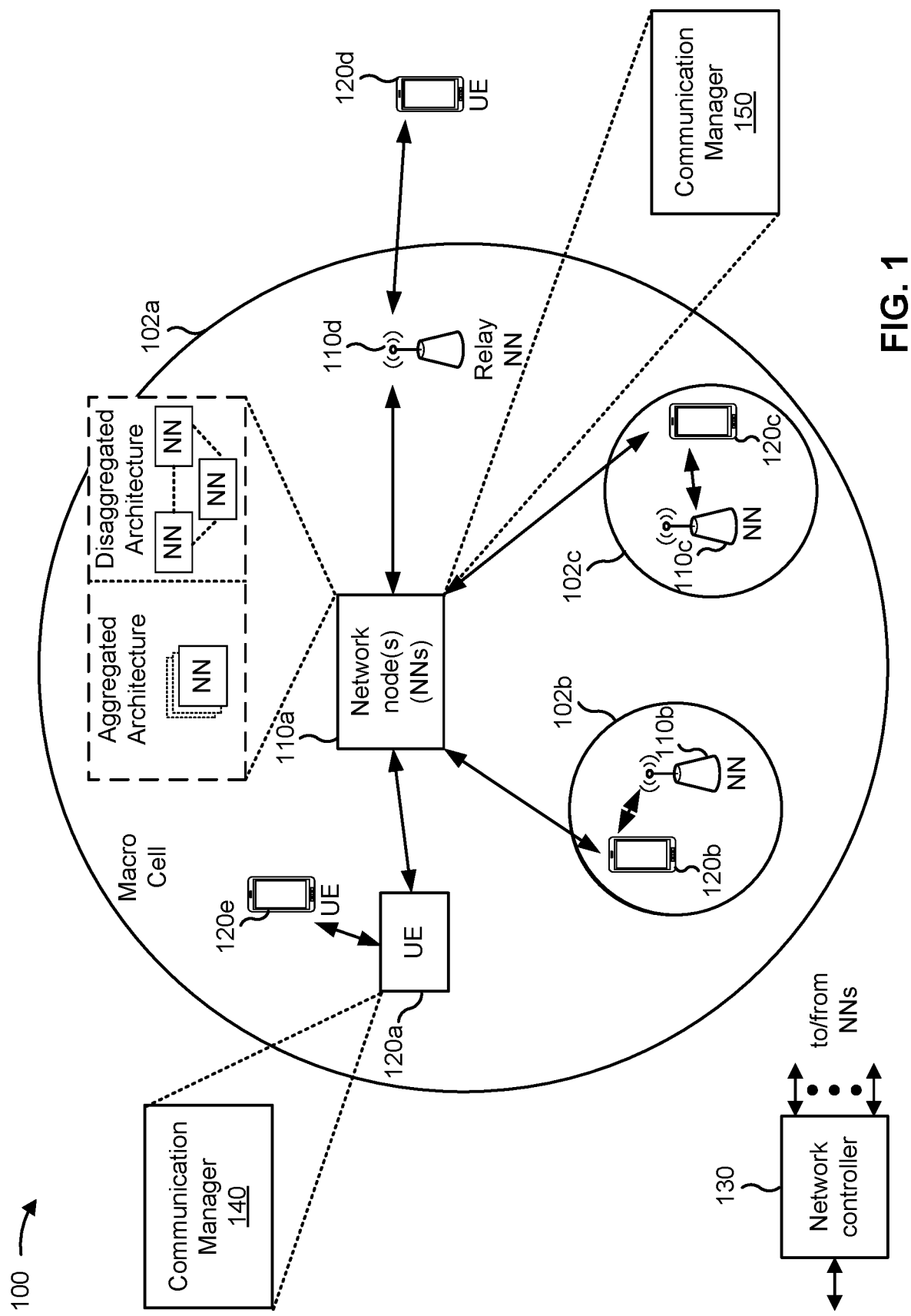
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a central network node, configuration information for reporting UE positioning information or distributed network node positioning information; identify one or more distributed network nodes based at least in part on respective connections between the one or more distributed network nodes and the UE or based at least in part on measurement information; obtain one or more encrypted identifiers respectively associated with the one or more distributed network nodes; and transmit, to the central network node, the one or more encrypted identifiers in accordance with the configuration information. Additionally, or alternatively, the communication manager 140 may perform one or more other operations described herein.

In some aspects, the network node 110 may include a communication manager 150. As described in more detail elsewhere herein, the communication manager 150 may receive, from a central network node, configuration information for reporting UE positioning information or distributed network node positioning information; identify one or more UEs based at least in part on respective connections between the one or more UEs and the distributed network node or based at least in part on measurement information; obtain one or more encrypted identifiers respectively associated with the one or more UEs; and transmit, to the central network node, the one or more encrypted identifiers in accordance with the configuration information. Additionally, or alternatively, the communication manager 150 may perform one or more other operations described herein.

As indicated above, FIG. 1 is provided as an example. Other examples may differ from what is described with regard to FIG. 1.

Figure 2:
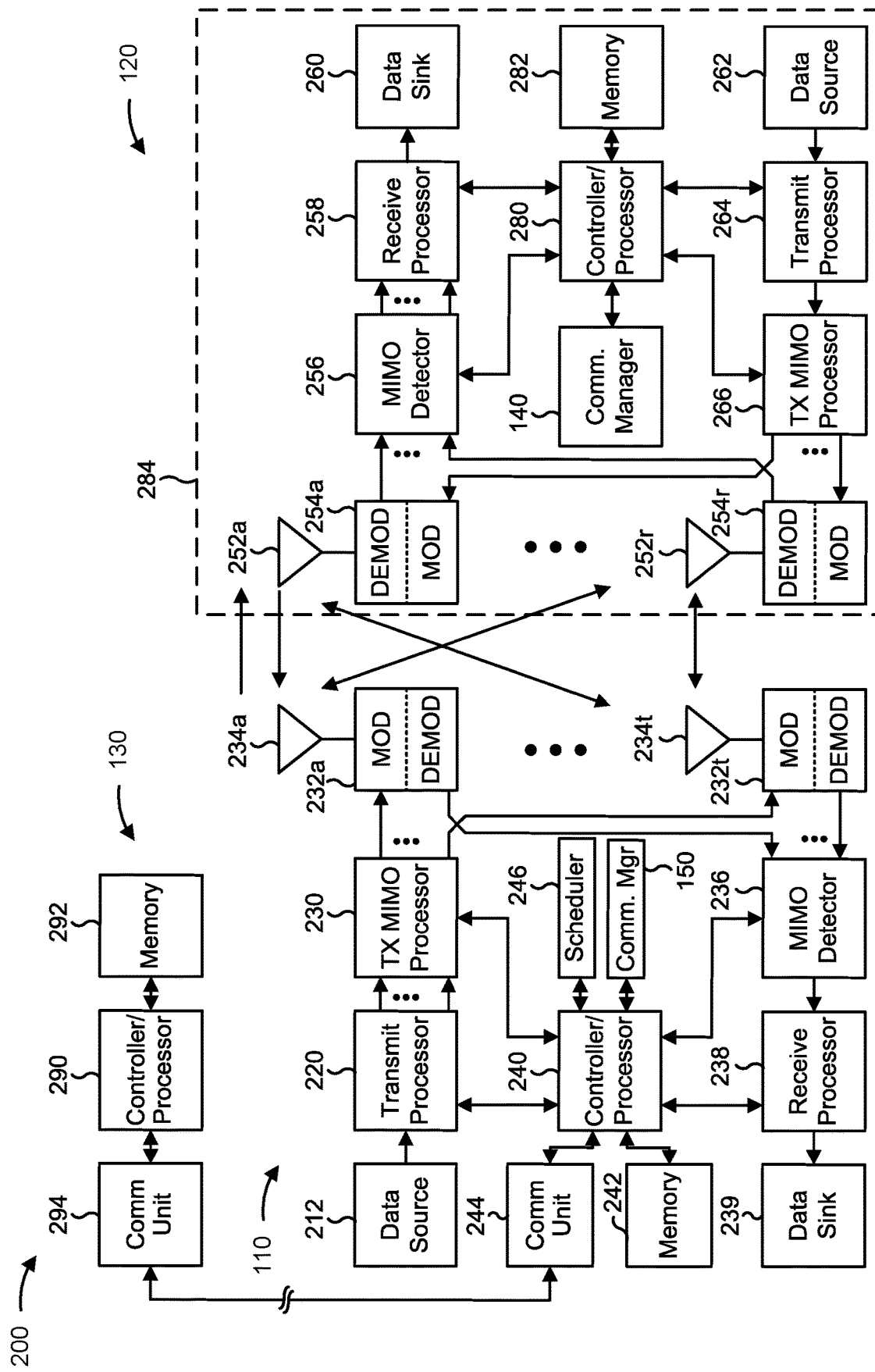
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with UE positioning, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (such as the UE 120) includes means for receiving, from a central network node, configuration information for reporting UE positioning information or distributed network node positioning information; means for identifying one or more distributed network nodes based at least in part on respective connections between the one or more distributed network nodes and the UE or based at least in part on measurement information; means for obtaining one or more encrypted identifiers respectively associated with the one or more distributed network nodes; and/or means for transmitting, to the central network node, the one or more encrypted identifiers in accordance with the configuration information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a distributed network node (such as the network node 110) includes means for receiving, from a central network node, configuration information for reporting UE positioning information or distributed network node positioning information; means for identifying one or more UEs based at least in part on respective connections between the one or more UEs and the distributed network node or based at least in part on measurement information; means for obtaining one or more encrypted identifiers respectively associated with the one or more UEs; and/or means for transmitting, to the central network node, the one or more encrypted identifiers in accordance with the configuration information. The means for the distributed network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
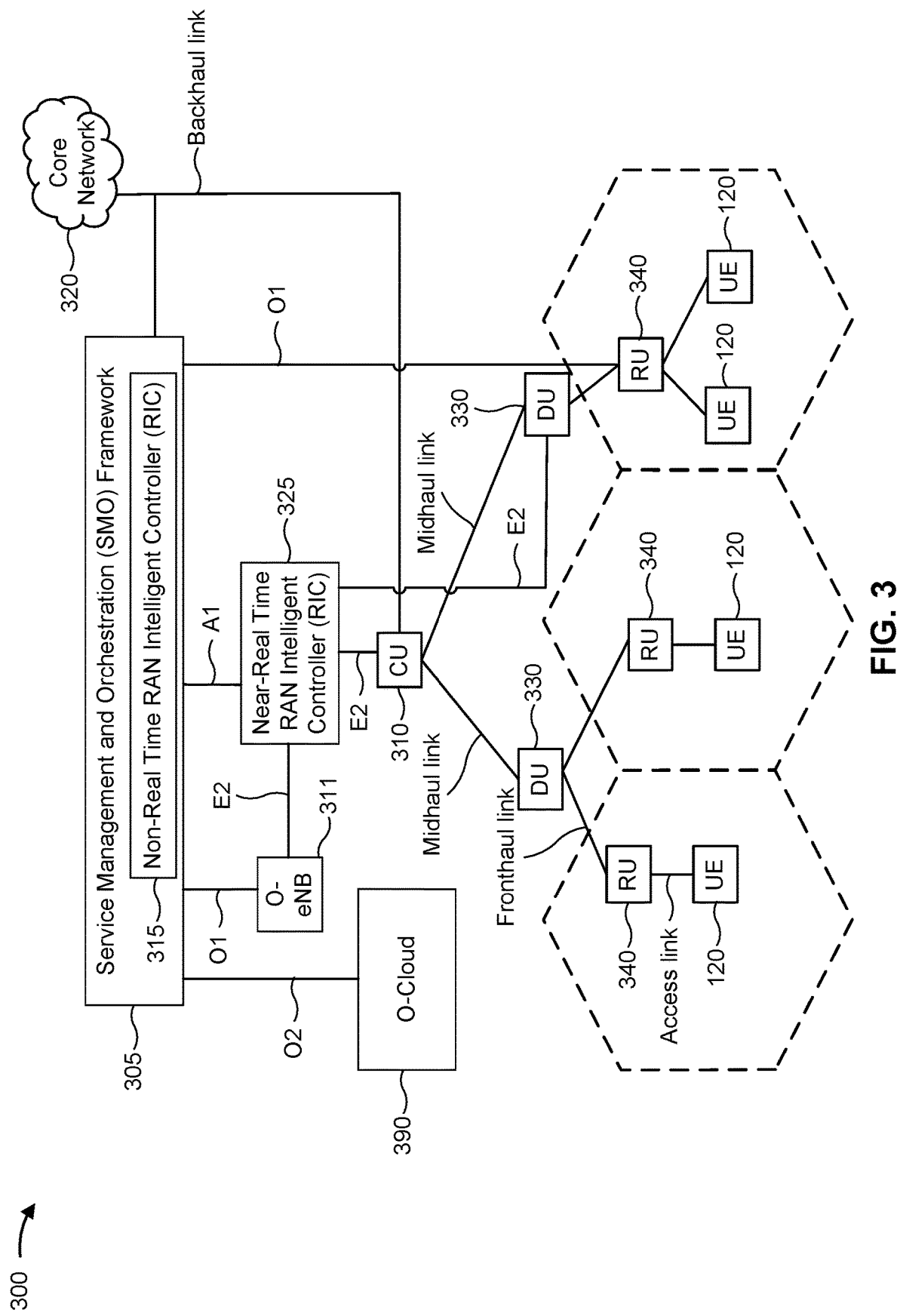
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
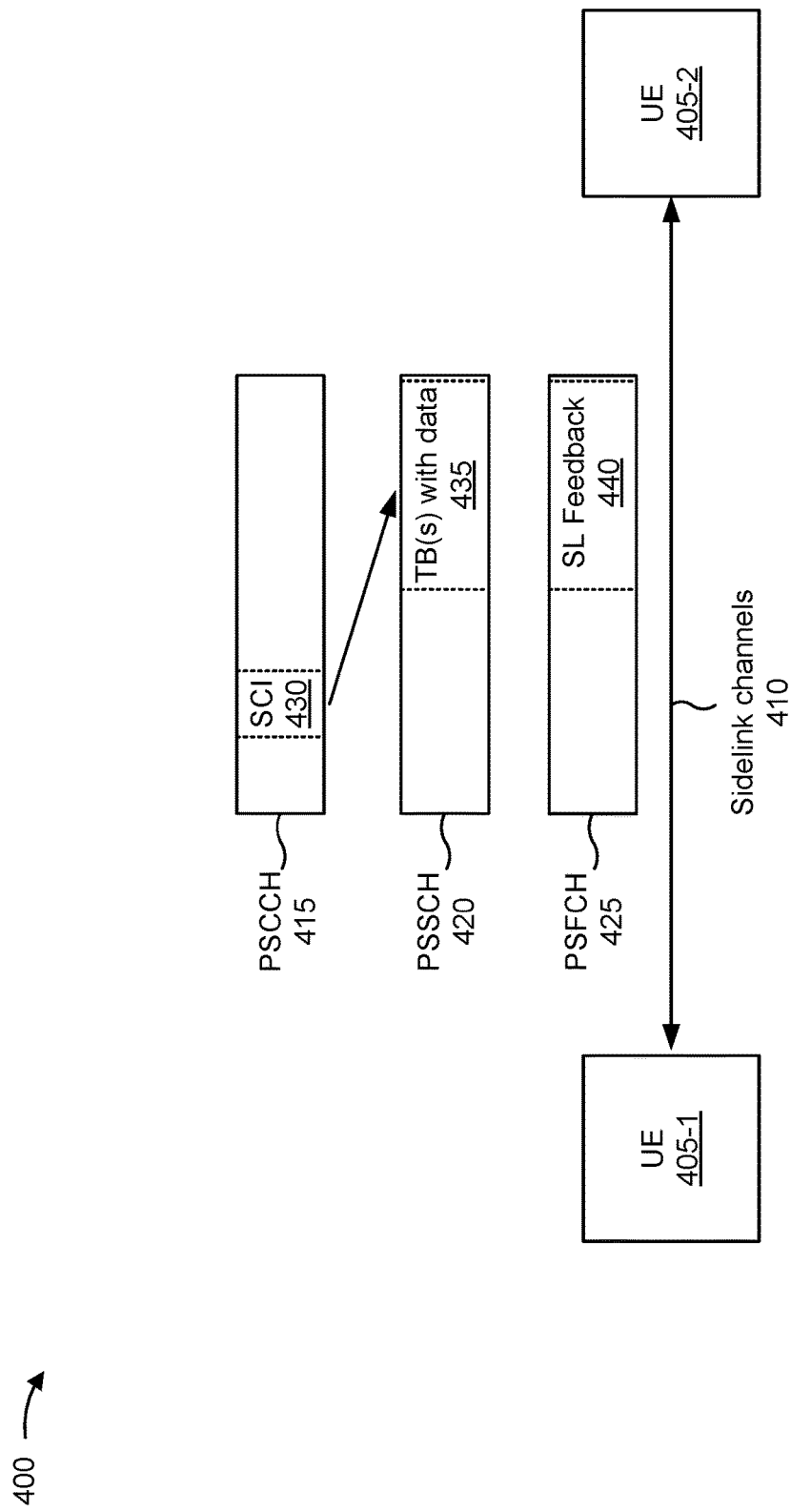
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
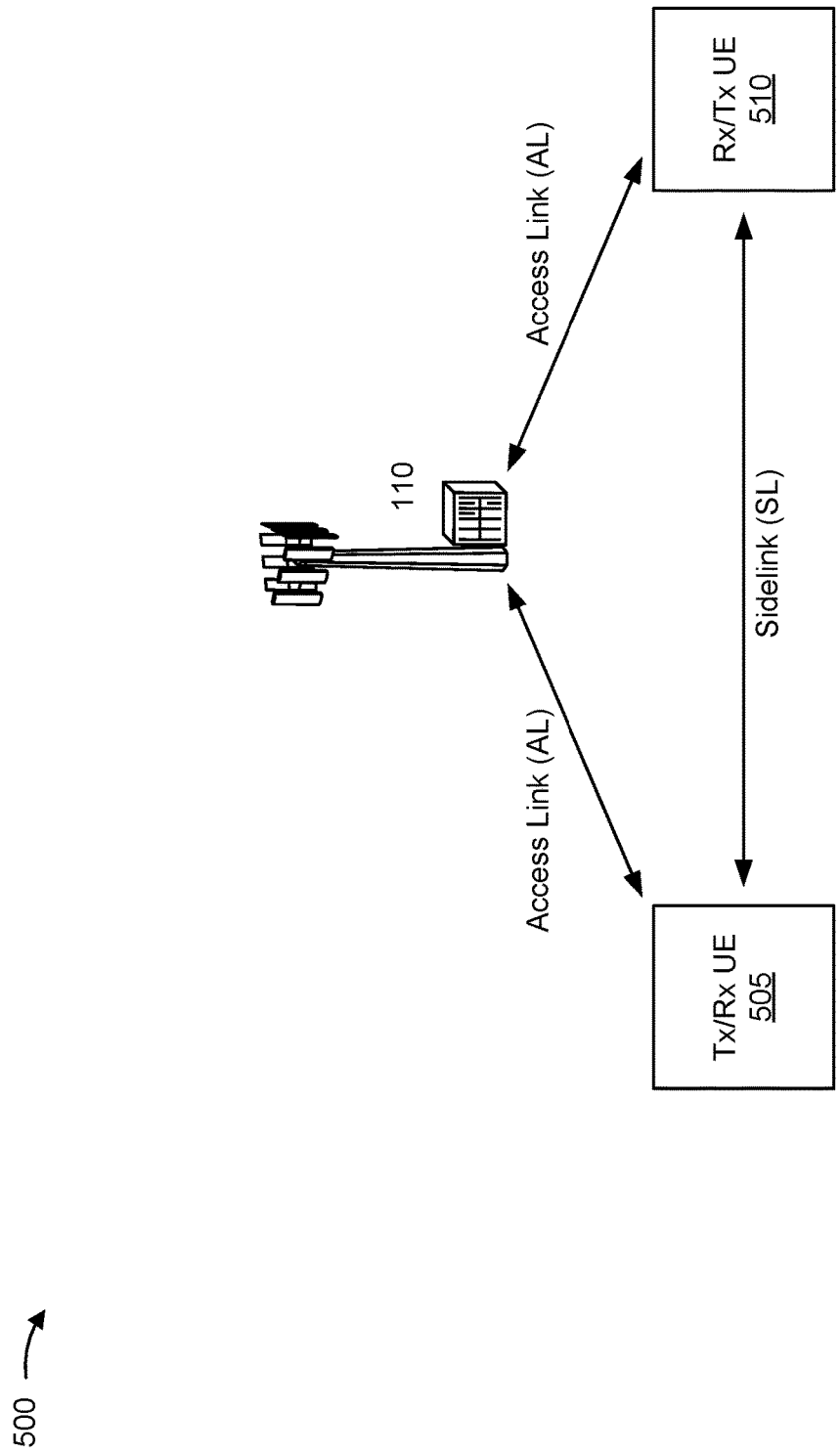
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
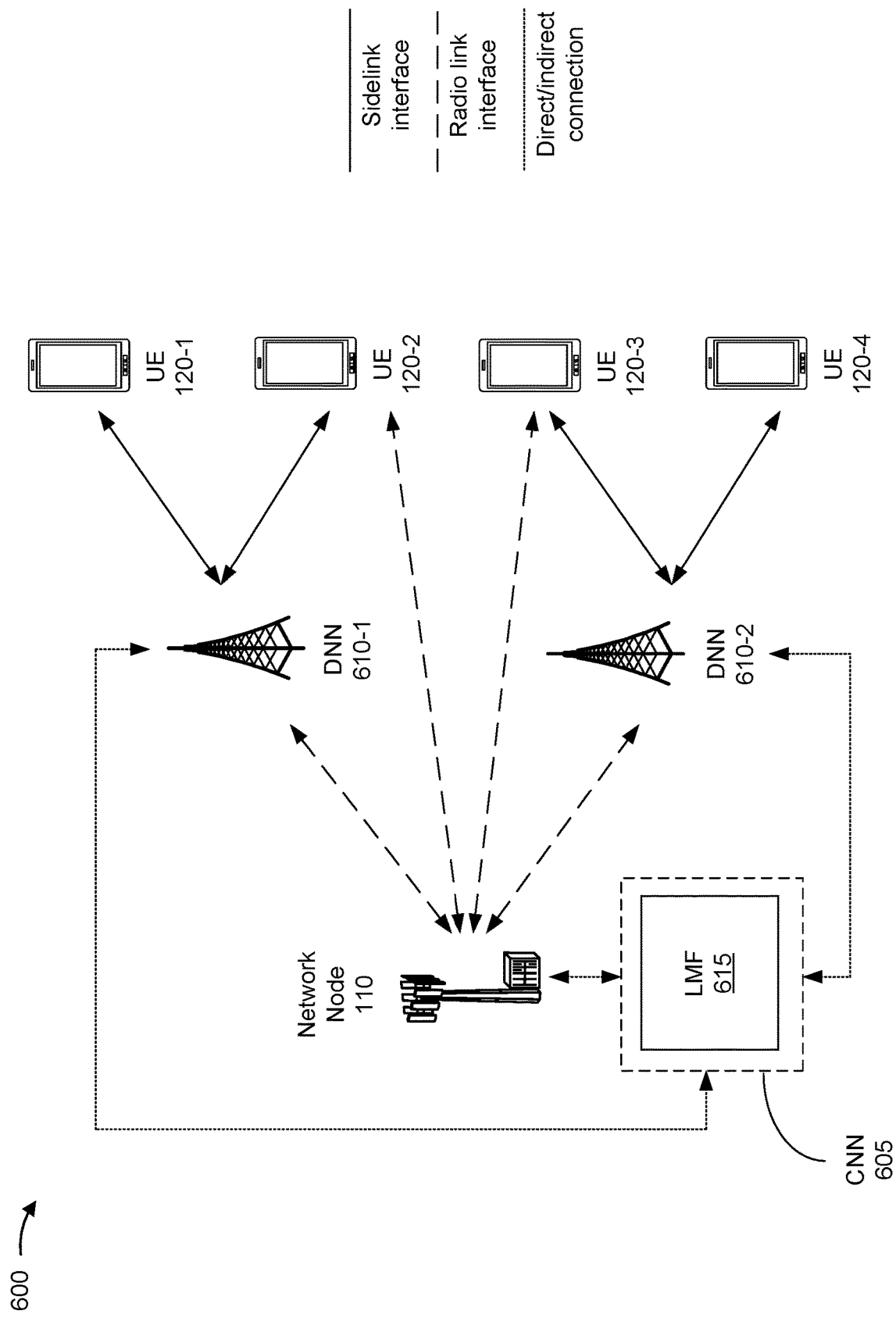
FIG. 6 is a diagram illustrating an example of network communications, in accordance with the present disclosure.

FIG. 6 is a diagram illustrating an example 600 of network communications, in accordance with the present disclosure. A central network node (CNN) 605 may communicate with one or more distributed network nodes (DNN) 610 and one or more UEs 120. In some cases, the CNN 605 may be the CU 310 or may include one or more features of the CU 310. Additionally, or alternatively, the CNN 605 may be configured to perform one or more core network functions, such as those associated with a location management function (LMF) 615. The LMF 615 may support location determination, downlink location measurements or estimates, uplink location measurements or estimates, and assistance data management, among other examples. In some cases, the DNN 610 may be the DU 330 or may include one or more features of the DU 330. In some cases, the DNN 610 may be a roadside unit (RSU). In some cases, the network node 110 may be a base station or may include one or more features of a base station, such as the disaggregated base station described herein.

The CNN 605 may communicate with the network node 110 using a direct connection or an indirect connection. Additionally, or alternatively, the CNN 605 may communicate with the DNN 610 (such as the DNN 610-1 and the DNN 610-2) using the direct connection or the indirect connection. The network node 110 may communicate with the DNN 610 (such as the DNN 610-1 and the DNN 610-2) using a radio link interface (such as a Uu interface). Additionally, or alternatively, the network node 110 may communicate directly with the UE 120 (such as the UE 120-2 and the UE 120-3) using the radio link interface. The DNN 610 may communicate with a UE 120 using a sidelink interface (such as a PC5 interface). For example, the DNN 610-1 may communicate with the UE 120-1 and the UE 120-2 using a sidelink interface, and the DNN 610-2 may communicate with the UE 120-3 and the UE 120-4 using another sidelink interface. In some cases, the network node 110 may communicate indirectly with the UE 120 through the DNN 610. For example, the network node 110 may communicate with the DNN 610-1 using the radio link interface and the DNN 610-1 may relay the communication to the UE 120-1 through the sidelink interface.

In some cases, sidelink positioning may be performed when the UE 120 is in an inactive state (such as RRC_INACTIVE) or when the UE 120 is in an idle state (such as RRC_IDLE). When the UE 120 is using network-assisted sidelink positioning, the UE 120 may need to transfer a radio spectrum policy program (RSPP) message or an LTE positioning protocol (LPP) message to the network. A small data transfer (SDT) feature may be used to enable the UE 120 to transfer data and/or signaling while the UE 120 is in the inactive state and without the UE 120 transitioning to a connected state (such as an RRC_CONNECTED state). When the UE 120 is in the idle state, the UE 120 may use an early data transmission (EDT) feature to transfer the data and/or signaling.

In some cases, the UE 120 may need to transition to a connected state to exchange signaling with the CNN 605 (such as the LMF 615). For example, in order for the UE 120-1 and the UE 120-4 (not having the direct connection to the network node 110) to perform network assisted operations, the UE 120-1 and UE 120-4 may need to transition to the RRC-CONNECTED state to exchange signaling with the LMF 615. However, the network node 110 may not support SDT and/or EDT features. Additionally, or alternatively, the UE 120 may be connected to the network via Layer 2 (L2) relays, which also may not support SDT and/or EDT features. Thus, the CNN 605 may not be able to determine reachability information for the UE 120. For example, the LMF 615 associated with the CNN 605 may not be able to determine whether the UE 120 is reachable via a sidelink interface (such as through the DNN 610) or via the radio link interface (such as through the network node 110). In these cases, the CNN 605 may not be able to determine positioning information associated with the UE 120, which may result in disrupted communications between the CNN 605 and the UE 120.

Techniques and apparatuses are described herein for UE positioning. In some aspects, a UE may receive configuration information from a central network node for reporting UE positioning information or distributed network node positioning information. The UE may identify one or more distributed network nodes based at least in part on respective connections between the one or more distributed network nodes and the UE, or based at least in part on measurement information. The UE may obtain one or more encrypted identifiers respectively associated with the one or more distributed network nodes, and may transmit the one or more encrypted identifiers to the central network node in accordance with the configuration information. In some aspects, a distributed network node may receive configuration information from a central network node for reporting UE positioning information or distributed network node positioning information. The distributed network node may identify one or more UEs based at least in part on respective connections between the one or more UEs and the distributed network node, or based at least in part on measurement information. The distributed network node may obtain one or more encrypted identifiers respectively associated with the one or more UEs, and may transmit the one or more encrypted identifiers to the central network node in accordance with the configuration information. As a result, the central network node may be able to determine positioning information for the UE whether the UE is connected directly to the network node (via a radio link interface) or is connected indirectly (via a distributed network node and a sidelink interface). This may result in improved communications between the UE and the central network node (such as the LMF function of the central network node). Additional details are described herein.

As indicated above, FIG. 6 is provided as an example. Other examples may differ from what is described with respect to FIG. 6.

Figure 7:
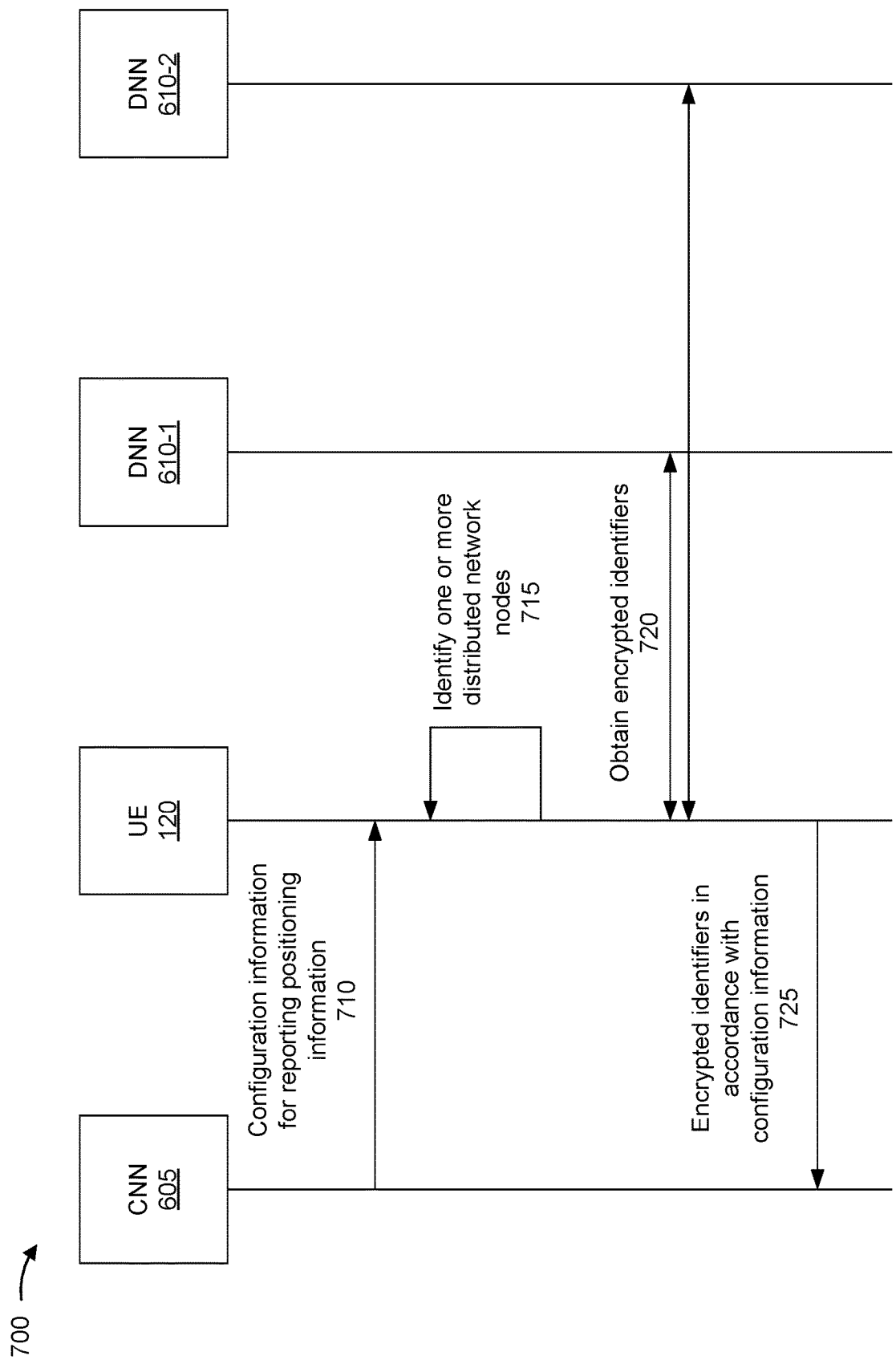
FIG. 7 is a diagram illustrating an example of UE positioning, in accordance with the present disclosure.

FIG. 7 is a diagram illustrating an example 700 of UE positioning, in accordance with the present disclosure. The UE 120 may communicate with the CNN 605 and one or more DNNs 610, such as DNN 610-1 and DNN 610-2. The CNN 605 may include the LMF 615 described herein.

As shown by reference number 710, the CNN 605 may transmit, and the UE 120 may receive, configuration information for reporting positioning information associated with the UE 120 or the DNN 610. In some aspects, the configuration information may include information for reporting reachability assistance information. Additional details are described below.

As shown by reference number 715, the UE 120 may identify one or more DNNs 610. In some aspects, the UE 120 may identify the one or more DNNs 610 based at least in part on respective connections between the one or more DNNs 610 and the UE 120. For example, the UE 120 may identify the DNN 610-1 based at least in part on an existing connection between the DNN 610-1 and the UE 120 and/or may identify the DNN 610-2 based at least in part on an existing connection between the DNN 610-2 and the UE 120. In some aspects, the UE 120 may identify the one or more DNNs based at least in part on measurement information. For example, the UE 120 may identify the DNN 610-1 based at least in part on the DNN 610-1 having an RSRP measurement that satisfies an RSRP measurement threshold and/or may identify the DNN 610-2 based at least in part on the DNN 610-2 having an RSRP measurement that satisfies the RSRP measurement threshold.

As shown by reference number 720, the UE 120 may obtain one or more encrypted identifiers associated with the one or more DNNs 610. For example, the UE 120 may obtain a first identifier (such as a first encrypted identifier) associated with the DNN 610-1 and a second identifier (such as a second encrypted identifier) associated with the DNN 610-2. The first identifier and/or the second identifier may be a subscriber concealed identifier (SUCI), a globally unique temporary identifier (GUTI), a general public subscription identifier (GPSI), or an international mobile subscriber identity (IMSI), among other examples.

In some aspects, the UE 120 may transmit, to the one or more identified DNNs, one or more requests for identifiers associated with the respective DNNs. For example, the UE 120 may transmit, and the DNN 610-1 may receive, a request for an identifier associated with the DNN 610-1. The DNN 610-1 may encrypt the identifier associated with the DNN 610-1 to generate the first encrypted identifier, and may transmit the first encrypted identifier to the UE 120. Similarly, the UE 120 may transmit, and the DNN 610-2 may receive, a request for an identifier associated with the DNN 610-2. The DNN 610-2 may encrypt the identifier associated with the DNN 610-2 to generate the second encrypted identifier, and may transmit the second encrypted identifier to the UE 120. In some aspects, the one or more identifiers may be encrypted based at least in part on a shared session key between the UE 120 and the corresponding DNN 610. For example, the DNN 610-1 may generate the first encrypted identifier based at least in part on a shared session key between the UE 120 and the DNN 610-1, and the DNN 610-2 may generate the second encrypted identifier based at least in part on another shared session key between the UE 120 and the DNN 610-2. In some aspects, the identifier may be encrypted based at least in part on a public key. For example, the DNN 610-1 may generate the first encrypted identifier based at least in part on a network public key and the DNN 610-2 may generate the second encrypted identifier based at least in part on the network public key (or another network public key).

As shown by reference number 725, the UE 120 may transmit, and the CNN 605 may receive, the one or more encrypted identifiers. The UE 120 may transmit the one or more encrypted identifiers in accordance with the configuration information.

In some aspects, the UE 120 may transmit the one or more encrypted identifiers using non-access stratum (NAS) signaling. For example, an encrypted identifier may be reported using an RRC connection (via the radio link interface) and using a next generation (NG) connection (via an N2 interface) for 3GPP access. In another example, an encrypted identifier may be reported using an Internet Protocol Security (IPsec) tunnel (via an NWu interface) and using the NG connection (via the N2 interface) for non-3GPP access. In some aspects, the UE 120 may transmit the one or more identifiers as assistance information using the LPP and/or based at least in part on a request from the LMF 615. An example of the LPP request from the LMF 615 to the UE 120, and a corresponding response from the UE 120 to the LMF 615, is shown below:

Example LPP request from LMF 615 to UE 120:

```
RequestAssistanceData-r9-IEs ::= SEQUENCE {
commonIEsRequestAssistanceData  CommonIEsRequestAssistanceData
   OPTIONAL,
epdu-RequestAssistanceData  EPDU-Sequence OPTIONAL,
LMF Reachability AssistanceData    Encrypted RSU IDs
... }
```

Example response from UE 120 to the LMF 615:

```
ProvideAssistanceData-r9-IEs ::= SEQUENCE {
commonIEsProvideAssistanceData CommonIEsProvideAssistanceData
```

-continued

```
OPTIONAL,
   -- Need ON
epdu-Provide-Assistance-Data        EPDU-Sequence OPTIONAL, --
                                    Need ON
LMF Reachability AssistanceData     Encrypted RSU ID1, RSU ID2,
                                    RSU ID3
... }
```

In some aspects, the configuration information may include information for reporting reachability information (such as the one or more encrypted identifiers). In some aspects, the configuration information may indicate for the UE 120 to periodically report the encrypted identifiers, such as in accordance with an interval. The UE 120 may transmit the one or more encrypted identifiers to the CNN 605 in accordance with the interval and based at least in part on the configuration information. For example, the configuration information may indicate for the UE 120 to transmit DNN identifiers every 10 ms. In this case, the UE 120 may transmit one or more encrypted identifiers associated with the one or more respective DNNs 610 every 10 ms.

In some aspects, the configuration information may indicate for the UE 120 to report the encrypted identifiers based at least in part on an occurrence of an event. In one example, the configuration information may indicate for the UE 120 to report a DNN identifier based at least in part on a DNN 610 no longer being connected to the UE 120 or no longer being within a connection area associated with the UE 120. In this case, the UE 120 may detect that the DNN 610 has lost connection to the UE 120 or has left the connection area associated with the UE 120, and may transmit the encrypted identifier associated with the DNN 610 to the CNN 605. In another example, the configuration information may indicate for the UE 120 to report a DNN identifier based at least in part on a DNN 610 connecting to the UE 120 or entering a connection area associated with the UE 120. In this case, the UE 120 may detect that the DNN 610 has connected to the UE 120 or has entered the connection area associated with the UE 120, and may transmit the encrypted identifier associated with the DNN 610 to the CNN 605. In another example, the configuration information may indicate for the UE 120 to report a DNN identifier based at least in part on a specific DNN (such as DNN 610-2) losing connection to the UE 120, leaving the connection area associated with the UE 120, connecting to the UE 120, or entering the connection area associated with the UE 120. In this case, the UE 120 may detect that the DNN 610-2 has lost connection to the UE 120, left the connection area associated with the UE 120, connected to the UE 120, or entered the connection area associated with the UE 120, and may transmit the encrypted identifier associated with the DNN 610-2 to the CNN 605.

In some aspects, the CNN 605 may release the radio link connection associated with the UE 120 based at least in part on configuring the UE 120 via the radio link interface. For example, the CNN 605 may transmit an indication to the network node 110 that subsequent positioning for the UE 120 can be performed via the sidelink interface, and may release the radio link connection between the UE 120 and the network node 110. This may result in network power savings.

In some aspects, the CNN 605 may detect that the UE 120 is reachable via one or more of the DNNs 610 (such as the DNN 610-1 or the DNN 610-2) based at least in part on the reachability information. The CNN 605 may transmit a positioning request to the UE 120 via one or more of the DNNs 610, rather than via the network node 110, based at least in part on this detection. In some aspects, the CNN 605 may route a positioning request to the UE 120 through the DNN 610 or through the network node 110 based at least in part on a positioning accuracy requirement and/or a QoS requirement. For example, positioning accuracy may be improved when the positioning request is routed through the DNN 610, but this may result in increased network overhead. In some aspects, the CNN 605 may route the positioning request through both the DNN 610 and the network node 110. For example, the CNN 605 may use joint Uu/SL positioning for transmitting the positioning request to the UE 120.

In some aspects, the encrypted identifiers may be resolved by the LMF 615 such that the LMF 615 is able to map the encrypted identifiers between the radio link interface and the sidelink interface. This may enable the LMF 615 to route the positioning request through the network node 110 (via the radio link interface) or through the DNN 610 (via the sidelink interface). In a case where the UE 120 becomes unreachable using the DNN 610, the LMF 615 may use typical (e.g., default) radio link techniques for UE positioning.

As indicated above, FIG. 7 is provided as an example. Other examples may differ from what is described with respect to FIG. 7.

Figure 8:
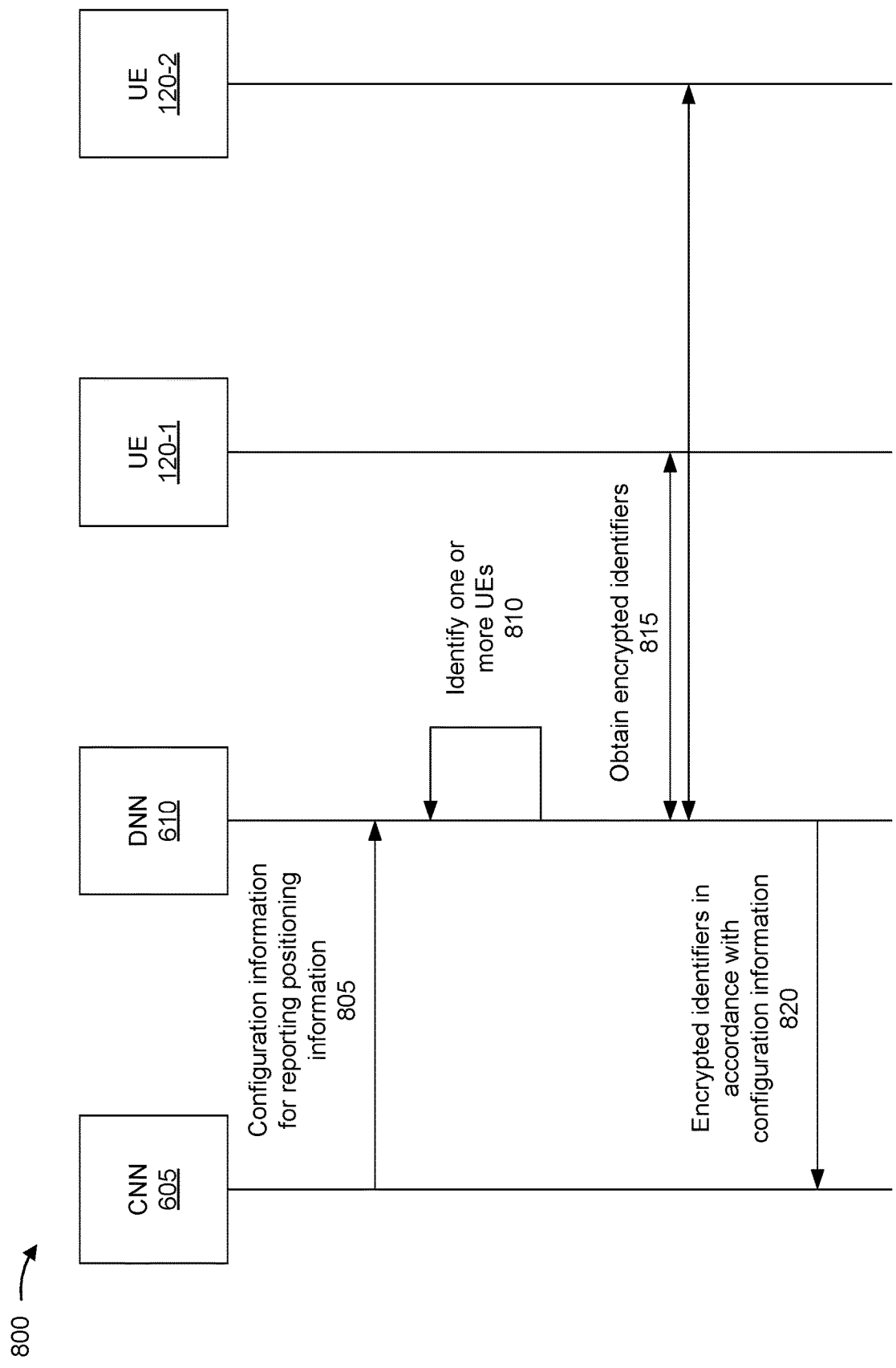
FIG. 8 is a diagram illustrating an example of UE positioning, in accordance with the present disclosure.

FIG. 8 is a diagram illustrating an example 800 of UE positioning, in accordance with the present disclosure. The DNN 610 may communicate with the CNN 605 and one or more UEs 120, such as UE 120-1 and UE 120-2. The CNN 605 may include the LMF 615 described herein.

As shown by reference number 805, the CNN 605 may transmit, and the DNN 610 may receive, configuration information for reporting positioning information associated with the UE 120 or the DNN 610. In some aspects, the configuration information may include information for reporting reachability assistance information. Additional details are described below.

As shown by reference number 810, the DNN 610 may identify one or more UEs 120. In some aspects, the DNN 610 may identify the one or more UEs 120 based at least in part on respective connections between the one or more UEs 120 and the DNN 610. For example, the DNN 610 may identify the UE 120-1 based at least in part on an existing connection between the UE 120-1 and the DNN 610 and/or may identify the UE 120-2 based at least in part on an existing connection between the UE 120-2 and the DNN 610. In some aspects, the DNN 610 may identify the one or more UEs based at least in part on measurement information. For example, the DNN 610 may identify the UE 120-1 based at least in part on the UE 120-1 having an RSRP measurement that satisfies an RSRP measurement threshold and/or may identify the UE 120-2 based at least in part on the UE 120-2 having an RSRP measurement that satisfies the RSRP measurement threshold.

As shown by reference number 815, the DNN 610 may obtain one or more encrypted identifiers associated with the one or more UEs 120. For example, the DNN 610 may obtain a first identifier (such as a first encrypted identifier) associated with the UE 120-1 and a second identifier (such as a second encrypted identifier) associated with the UE 120-2. The first identifier and/or the second identifier may be an SUCI, a GUTI, a GPSI, or an IMSI, among other examples.

In some aspects, the DNN 610 may transmit, to the one or more identified UEs, one or more requests for identifiers associated with the respective UEs. For example, the DNN 610 may transmit, and the UE 120-1 may receive, a request for an identifier associated with the UE 120-1. The UE 120-1 may encrypt the identifier associated with the UE 120-1 to generate the first encrypted identifier, and may transmit the first encrypted identifier to the DNN 610. Similarly, the DNN 610 may transmit, and the UE 120-2 may receive, a request for an identifier associated with the UE 120-2. The UE 120-2 may encrypt the identifier associated with the UE 120-2 to generate the second encrypted identifier, and may transmit the second encrypted identifier to the DNN 610. In some aspects, the one or more identifiers may be encrypted based at least in part on a shared session key between the DNN 610 and the corresponding UE 120. For example, the UE 120-1 may generate the first encrypted identifier based at least in part on a shared session key between the DNN 610 and the UE 120-1, and the UE 120-2 may generate the second encrypted identifier based at least in part on another shared session key between the DNN 610 and the UE 120-2. In some aspects, the identifier may be encrypted based at least in part on a public key. For example, the UE 120-1 may generate the first encrypted identifier based at least in part on a network public key and the UE 120-2 may generate the second encrypted identifier based at least in part on the network public key (or another network public key).

As shown by reference number 820, the DNN 610 may transmit, and the CNN 605 may receive, the one or more encrypted identifiers. The DNN 610 may transmit the one or more encrypted identifiers in accordance with the configuration information.

In some aspects, the DNN 610 may transmit the one or more encrypted identifiers using NAS signaling. For example, an encrypted identifier may be reported using an RRC connection (via the radio link interface) and using an NG connection (via an N2 interface) for 3GPP access. In another example, an encrypted identifier may be reported using an IPsec tunnel (via an NWu interface) and using the NG connection (via the N2 interface) for non-3GPP access. In some aspects, the DNN 610 may transmit the one or more identifiers as assistance information using the LPP and/or based at least in part on a request from the LMF 615. The DNN 610 and the LMF 615 may exchange LPP request information and LPP response information as described above in connection with FIG. 7.

In some aspects, the configuration information may include information for reporting reachability information (such as the one or more encrypted identifiers). In some aspects, the configuration information may indicate for the DNN 610 to periodically report the encrypted identifiers, such as in accordance with an interval. The DNN 610 may transmit the one or more encrypted identifiers to the CNN 605 in accordance with the interval and based at least in part on the configuration information. For example, the configuration information may indicate for the DNN 610 to transmit UE identifiers every 10 ms. In this case, the DNN 610 may transmit one or more encrypted identifiers associated with the one or more respective UEs 120 every 10 ms.

In some aspects, the configuration information may indicate for the DNN 610 to report the encrypted identifiers based at least in part on an occurrence of an event. In one example, the configuration information may indicate for the DNN 610 to report a UE identifier based at least in part on a UE 120 no longer being connected to the DNN 610 or no longer being within a connection area associated with the DNN 610. In this case, the DNN 610 may detect that the UE 120 has lost connection to the DNN 610 or has left the connection area associated with the DNN 610, and may transmit the encrypted identifier associated with the UE 120 to the CNN 605. In another example, the configuration information may indicate for the DNN 610 to report a UE identifier based at least in part on a UE 120 connecting to the DNN 610 or entering a connection area associated with the DNN 610. In this case, the DNN 610 may detect that the UE 120 has connected to the DNN 610 or has entered the connection area associated with the DNN 610, and may transmit the encrypted identifier associated with the UE 120 to the CNN 605. In another example, the configuration information may indicate for the DNN 610 to report a UE identifier based at least in part on a specific UE (such as UE 120-2) losing connection to the DNN 610, leaving the connection area associated with the DNN 610, connecting to the DNN 610, or entering the connection area associated with the DNN 610. In this case, the DNN 610 may detect that the UE 120-2 has lost connection to the DNN 610, left the connection area associated with the DNN 610, connected to the DNN 610, or entered the connection area associated with the DNN 610, and may transmit the encrypted identifier associated with the UE 120-2 to the CNN 605.

In some aspects, the CNN 605 may release the radio link connection associated with the UE 120 based at least in part on configuring the UE 120 via the radio link interface. For example, the CNN 605 may transmit an indication to the network node 110 indicating that subsequent positioning for the UE 120 can be performed via the sidelink interface, and may release the radio link connection between the UE 120 and the network node 110. This may result in network power savings.

In some aspects, the CNN 605 may detect that the UE 120 is reachable via the DNN 610 based at least in part on the reachability information. The CNN 605 may transmit a positioning request to the UE 120 via the DNN 610, rather than via the network node 110, based at least in part on this detection. In some aspects, the CNN 605 may route a positioning request to the UE 120 through the DNN 610 or through the network node 110 based at least in part on a positioning accuracy requirement and/or a QoS requirement. For example, positioning accuracy may be improved when the positioning request is routed through the DNN 610, but this may result in increased network overhead. In some aspects, the CNN 605 may route the positioning request through both the DNN 610 and the network node 110. For example, the CNN 605 may use joint Uu/SL positioning for transmitting the positioning request to the UE 120.

In some aspects, the encrypted identifiers may be resolved by the LMF 615 such that the LMF 615 is able to map the encrypted identifiers between the radio link interface and the sidelink interface. This may enable the LMF 615 to route the positioning request through the network node 110 (via the radio link interface) or through the DNN 610 (via the sidelink interface). In the event that the UE 120 becomes unreachable using the DNN 610, the LMF 615 may use typical (e.g., default) radio link techniques for UE positioning.

As indicated above, FIG. 8 is provided as an example. Other examples may differ from what is described with respect to FIG. 8.

Figure 9:
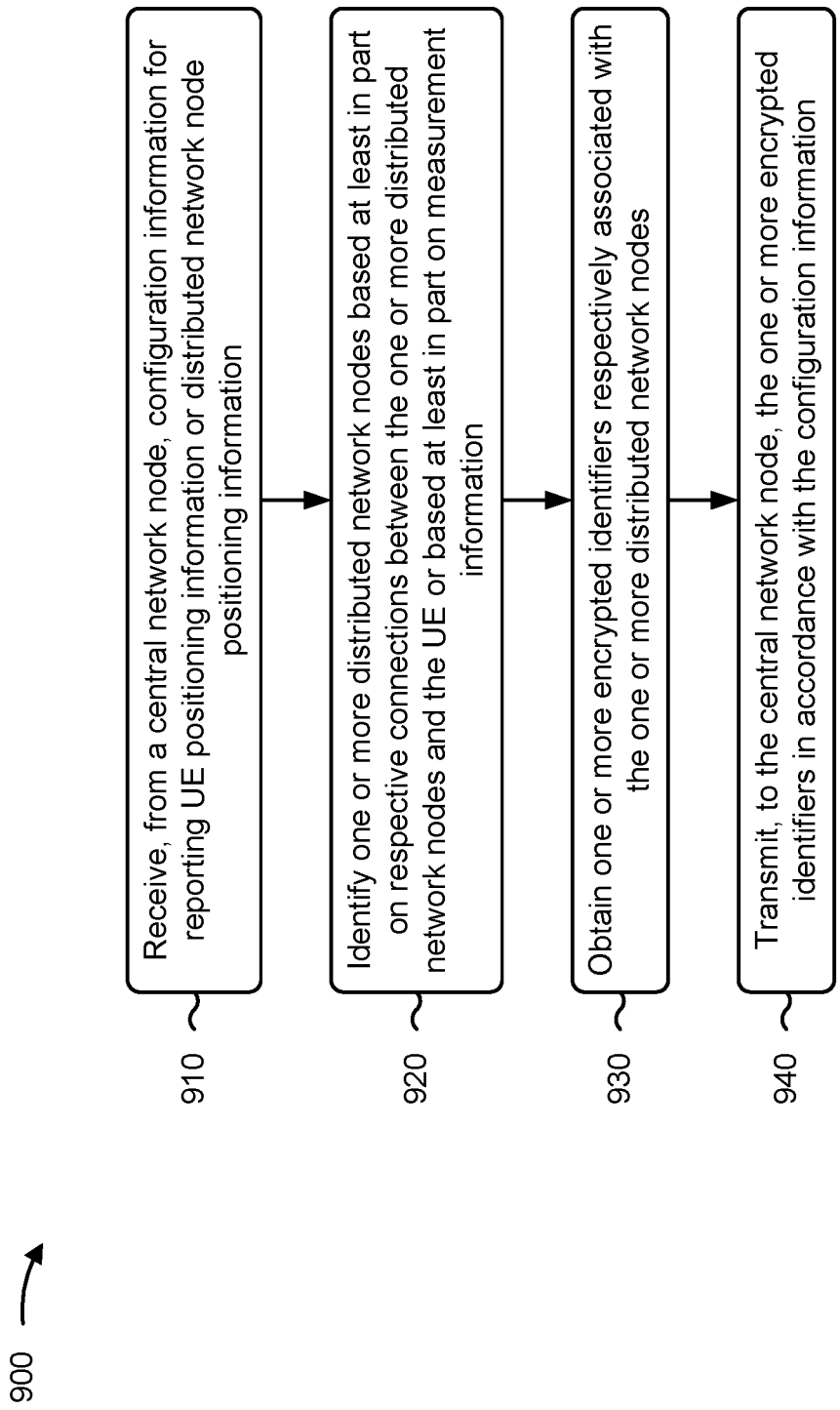
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with UE positioning.

As shown in FIG. 9, in some aspects, process 900 may include receiving, from a central network node, configuration information for reporting UE positioning information or distributed network node positioning information (block 910). For example, the UE (e.g., using communication manager 140 and/or reception component 1102, depicted in FIG. 11) may receive, from a central network node, configuration information for reporting UE positioning information or distributed network node positioning information, as described above.

As further shown in FIG. 9, in some aspects, process 900 may include identifying one or more distributed network nodes based at least in part on respective connections between the one or more distributed network nodes and the UE or based at least in part on measurement information (block 920). For example, the UE (e.g., using communication manager 140 and/or identification component 1108, depicted in FIG. 11) may identify one or more distributed network nodes based at least in part on respective connections between the one or more distributed network nodes and the UE or based at least in part on measurement information, as described above.

As further shown in FIG. 9, in some aspects, process 900 may include obtaining one or more encrypted identifiers respectively associated with the one or more distributed network nodes (block 930). For example, the UE (e.g., using communication manager 140 and/or obtaining component 1110, depicted in FIG. 11) may obtain one or more encrypted identifiers respectively associated with the one or more distributed network nodes, as described above.

As further shown in FIG. 9, in some aspects, process 900 may include transmitting, to the central network node, the one or more encrypted identifiers in accordance with the configuration information (block 940). For example, the UE (e.g., using communication manager 140 and/or transmission component 1104, depicted in FIG. 11) may transmit, to the central network node, the one or more encrypted identifiers in accordance with the configuration information, as described above.

Process 900 may include additional aspects, such as any single aspect or any combination of aspects described below and/or in connection with one or more other processes described elsewhere herein.

In a first aspect, receiving the configuration information comprises receiving the configuration information from the central network node via a radio link interface, wherein obtaining the one or more encrypted identifiers comprises receiving the one or more encrypted identifiers from the one or more distributed network nodes via a sidelink interface, and wherein transmitting the one or more encrypted identifiers comprises transmitting the one or more encrypted identifiers to the central network node via the radio link interface.

In a second aspect, alone or in combination with the first aspect, process 900 includes receiving an indication that a radio link connection to the central network node for transmitting positioning information has been released, and transmitting positioning information to the one or more distributed network nodes via a sidelink interface based at least in part on the indication that the radio link connection has been released.

In a third aspect, alone or in combination with one or more of the first and second aspects, transmitting the one or more encrypted identifiers comprises transmitting the one or more encrypted identifiers to the central network node based at least in part on a location management function of the central network node.

In a fourth aspect, alone or in combination with one or more of the first through third aspects, identifying the one or more distributed network nodes based at least in part on the respective connections between the one or more distributed network nodes and the UE comprises identifying one or more distributed network nodes having an existing connection to the UE, and identifying the one or more distributed network nodes based at least in part on the measurement information comprises identifying one or more distributed network nodes having a reference signal received power measurement that satisfies a reference signal received power measurement threshold.

In a fifth aspect, alone or in combination with one or more of the first through fourth aspects, obtaining the one or more encrypted identifiers respectively associated with the one or more distributed network nodes comprises transmitting, to the one or more distributed network nodes based at least in part on the configuration information, an identification request, and receiving, from the one or more distributed network nodes based at least in part on the identification request, the one or more encrypted identifiers respectively associated with the one or more distributed network nodes.

In a sixth aspect, alone or in combination with one or more of the first through fifth aspects, the one or more encrypted identifiers include at least one of a subscriber concealed identifier, a globally unique temporary identifier, a general public subscription identifier, or an international mobile subscriber identity.

In a seventh aspect, alone or in combination with one or more of the first through sixth aspects, each encrypted identifier of the one or more encrypted identifiers is encrypted based at least in part on a shared session key between the UE and a corresponding distributed network node of the one or more distributed network nodes, or is encrypted based at least in part on a public key associated with a network that is used for communications between the UE and the corresponding distributed network node.

In an eighth aspect, alone or in combination with one or more of the first through seventh aspects, transmitting the one or more encrypted identifiers comprises transmitting the one or more encrypted identifiers to the central network node using non-access stratus signaling or transmitting the one or more encrypted identifiers to the central network node as assistance information in accordance with a positioning protocol.

In a ninth aspect, alone or in combination with one or more of the first through eighth aspects, the configuration information indicates for the UE to transmit the one or more encrypted identifiers to the central network node in accordance with an interval, and transmitting the one or more encrypted identifiers to the central network node comprises transmitting the one or more encrypted identifiers to the central network node in accordance with the interval.

In a tenth aspect, alone or in combination with one or more of the first through ninth aspects, the configuration information indicates for the UE to transmit the one or more encrypted identifiers to the central network node based at least in part on an event, and transmitting the one or more encrypted identifiers to the central network node comprises transmitting the one or more encrypted identifiers to the central network node based at least in part on an occurrence of the event.

In an eleventh aspect, alone or in combination with one or more of the first through tenth aspects, the event is at least one of a distributed network node of the one or more distributed network nodes moving outside of a connection area associated with the UE, a distributed network node of the one or more distributed network nodes moving within the connection area associated with the UE, or a select distributed network node of the one or more distributed network nodes moving outside of the connection area of the UE or within the connection area of the UE.

In a twelfth aspect, alone or in combination with one or more of the first through eleventh aspects, process 900 includes receiving a positioning request from a distributed network node of the one or more distributed network nodes based at least in part on transmitting the one or more encrypted identifiers to the central network node.

In a thirteenth aspect, alone or in combination with one or more of the first through twelfth aspects, process 900 includes receiving a positioning request from the central network node and a distributed network node of the one or more distributed network nodes based at least in part on transmitting the one or more encrypted identifiers to the central network node and based at least in part on an accuracy requirement.

In a fourteenth aspect, alone or in combination with one or more of the first through thirteenth aspects, process 900 includes receiving a positioning request from the central network node and a distributed network node of the one or more distributed network nodes based at least in part on transmitting the one or more encrypted identifiers to the central network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
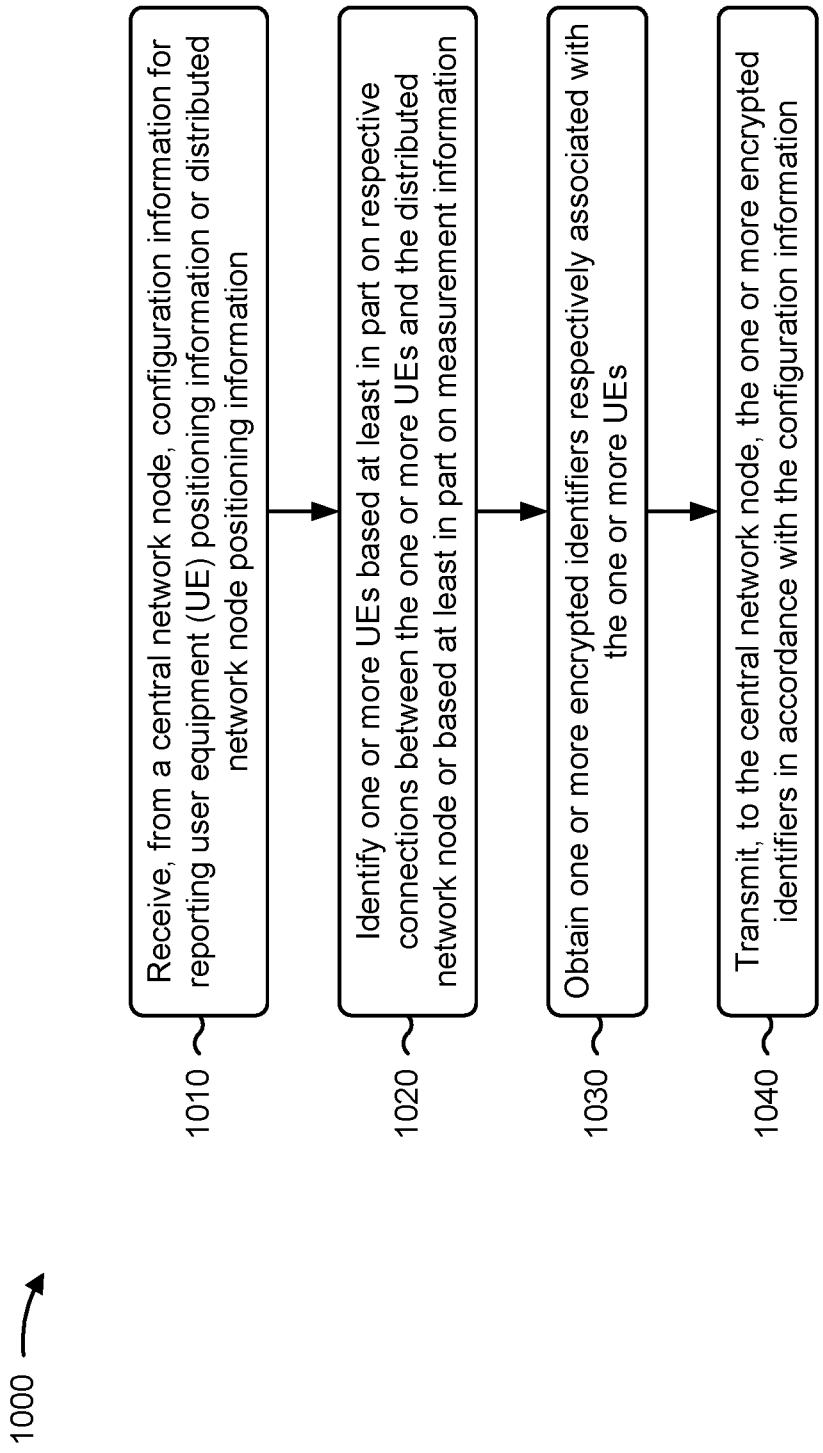
FIG. 10 is a diagram illustrating an example process performed, for example, by a distributed network node, in accordance with the present disclosure.

FIG. 10 is a diagram illustrating an example process 1000 performed, for example, by a distributed network node, in accordance with the present disclosure. Example process 1000 is an example where the distributed network node (e.g., distributed network node 610) performs operations associated with UE positioning.

As shown in FIG. 10, in some aspects, process 1000 may include receiving, from a central network node, configuration information for reporting UE positioning information or distributed network node positioning information (block 1010). For example, the distributed network node (e.g., using communication manager 150 and/or reception component 1202, depicted in FIG. 12) may receive, from a central network node, configuration information for reporting UE positioning information or distributed network node positioning information, as described above.

As further shown in FIG. 10, in some aspects, process 1000 may include identifying one or more UEs based at least in part on respective connections between the one or more UEs and the distributed network node or based at least in part on measurement information (block 1020). For example, the distributed network node (e.g., using communication manager 150 and/or identification component 1108, depicted in FIG. 11) may identify one or more UEs based at least in part on respective connections between the one or more UEs and the distributed network node or based at least in part on measurement information, as described above.

As further shown in FIG. 10, in some aspects, process 1000 may include obtaining one or more encrypted identifiers respectively associated with the one or more UEs (block 1030). For example, the distributed network node (e.g., using communication manager 150 and/or obtaining component 1110, depicted in FIG. 11) may obtain one or more encrypted identifiers respectively associated with the one or more UEs, as described above.

As further shown in FIG. 10, in some aspects, process 1000 may include transmitting, to the central network node, the one or more encrypted identifiers in accordance with the configuration information (block 1040). For example, the distributed network node (e.g., using communication manager 150 and/or transmission component 1104, depicted in FIG. 11) may transmit, to the central network node, the one or more encrypted identifiers in accordance with the configuration information, as described above.

Process 1000 may include additional aspects, such as any single aspect or any combination of aspects described below and/or in connection with one or more other processes described elsewhere herein.

In a first aspect, receiving the configuration information comprises receiving the configuration information from the central network node via a radio link interface, wherein obtaining the one or more encrypted identifiers comprises receiving the one or more encrypted identifiers from the one or more UEs via a sidelink interface, and wherein transmitting the one or more encrypted identifiers comprises transmitting the one or more encrypted identifiers to the central network node via the radio link interface.

In a second aspect, alone or in combination with the first aspect, transmitting the one or more encrypted identifiers comprises transmitting the one or more encrypted identifiers to the central network node based at least in part on a location management function of the central network node.

In a third aspect, alone or in combination with one or more of the first and second aspects, identifying the one or more UEs based at least in part on the respective connections between the one or more UEs and the distributed network node comprises identifying one or more UEs having an existing connection to the distributed network node, and identifying the one or more UEs based at least in part on the measurement information comprises identifying one or more UEs having a reference signal received power measurement that satisfies a reference signal received power measurement threshold.

In a fourth aspect, alone or in combination with one or more of the first through third aspects, obtaining the one or more encrypted identifiers respectively associated with the one or more UEs comprises transmitting, to the one or more UEs based at least in part on the configuration information, an identification request, and receiving, from the one or more UEs based at least in part on the identification request, the one or more encrypted identifiers respectively associated with the one or more UEs.

In a fifth aspect, alone or in combination with one or more of the first through fourth aspects, the one or more encrypted identifiers include at least one of a subscriber concealed identifier, a globally unique temporary identifier, a general public subscription identifier, or an international mobile subscriber identity.

In a sixth aspect, alone or in combination with one or more of the first through fifth aspects, each encrypted identifier of the one or more encrypted identifiers is encrypted based at least in part on a shared session key between the distributed network node and a corresponding UE of the one or more UEs, or is encrypted based at least in part on a public key associated with a network that is used for communications between the distributed network node and the corresponding UE.

In a seventh aspect, alone or in combination with one or more of the first through sixth aspects, transmitting the one or more encrypted identifiers comprises transmitting the one or more encrypted identifiers to the central network node using non-access stratus signaling or transmitting the one or more encrypted identifiers to the central network node as assistance information in accordance with a positioning protocol.

In an eighth aspect, alone or in combination with one or more of the first through seventh aspects, the configuration information indicates for the distributed network node to transmit the one or more encrypted identifiers to the central network node in accordance with an interval, and transmitting the one or more encrypted identifiers to the central network node comprises transmitting the one or more encrypted identifiers to the central network node in accordance with the interval.

In a ninth aspect, alone or in combination with one or more of the first through eighth aspects, the configuration information indicates for the distributed network node to transmit the one or more encrypted identifiers to the central network node based at least in part on an event, and transmitting the one or more encrypted identifiers to the central network node comprises transmitting the one or more encrypted identifiers to the central network node based at least in part on an occurrence of the event.

In a tenth aspect, alone or in combination with one or more of the first through ninth aspects, the event is at least one of a UE of the one or more UEs moving outside of a connection area associated with the distributed network node, a UE of the one or more UEs moving within the connection area associated with the distributed network node, or a select UE of the one or more UEs moving outside of the connection area of the distributed network node or within the connection area of the distributed network node.

In an eleventh aspect, alone or in combination with one or more of the first through tenth aspects, process 1000 includes transmitting a positioning request to a UE of the one or more UEs based at least in part on transmitting the one or more encrypted identifiers to the central network node.

In a twelfth aspect, alone or in combination with one or more of the first through eleventh aspects, transmitting the positioning request to the UE comprises transmitting the positioning request to the UE based at least in part on an accuracy requirement.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
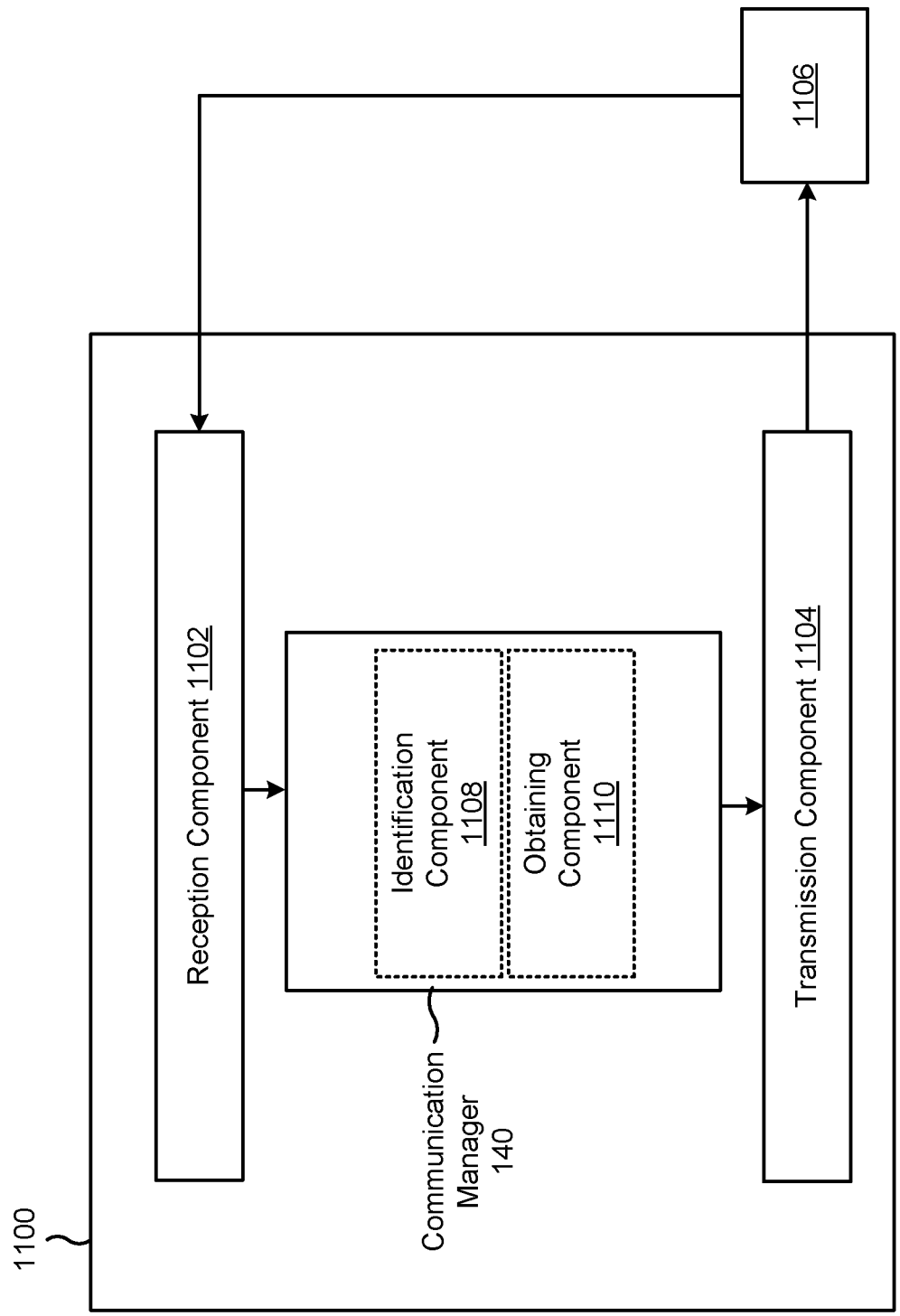
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an identification component 1108 or an obtaining component 1110, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a central network node, configuration information for reporting UE positioning information or distributed network node positioning information. The identification component 1108 may identify one or more distributed network nodes based at least in part on respective connections between the one or more distributed network nodes and the UE or based at least in part on measurement information. The obtaining component 1110 and/or the reception component 1102 may obtain one or more encrypted identifiers respectively associated with the one or more distributed network nodes. The transmission component 1104 may transmit, to the central network node, the one or more encrypted identifiers in accordance with the configuration information.

The reception component 1102 may receive an indication that a radio link connection to the central network node for transmitting positioning information has been released. The transmission component 1104 may transmit positioning information to the one or more distributed network nodes via a sidelink interface based at least in part on the indication that the radio link connection has been released. The reception component 1102 may receive a positioning request from a distributed network node of the one or more distributed network nodes based at least in part on transmitting the one or more encrypted identifiers to the central network node. The reception component 1102 may receive a positioning request from the central network node and a distributed network node of the one or more distributed network nodes based at least in part on transmitting the one or more encrypted identifiers to the central network node and based at least in part on an accuracy requirement. The reception component 1102 may receive a positioning request from the central network node and a distributed network node of the one or more distributed network nodes based at least in part on transmitting the one or more encrypted identifiers to the central network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
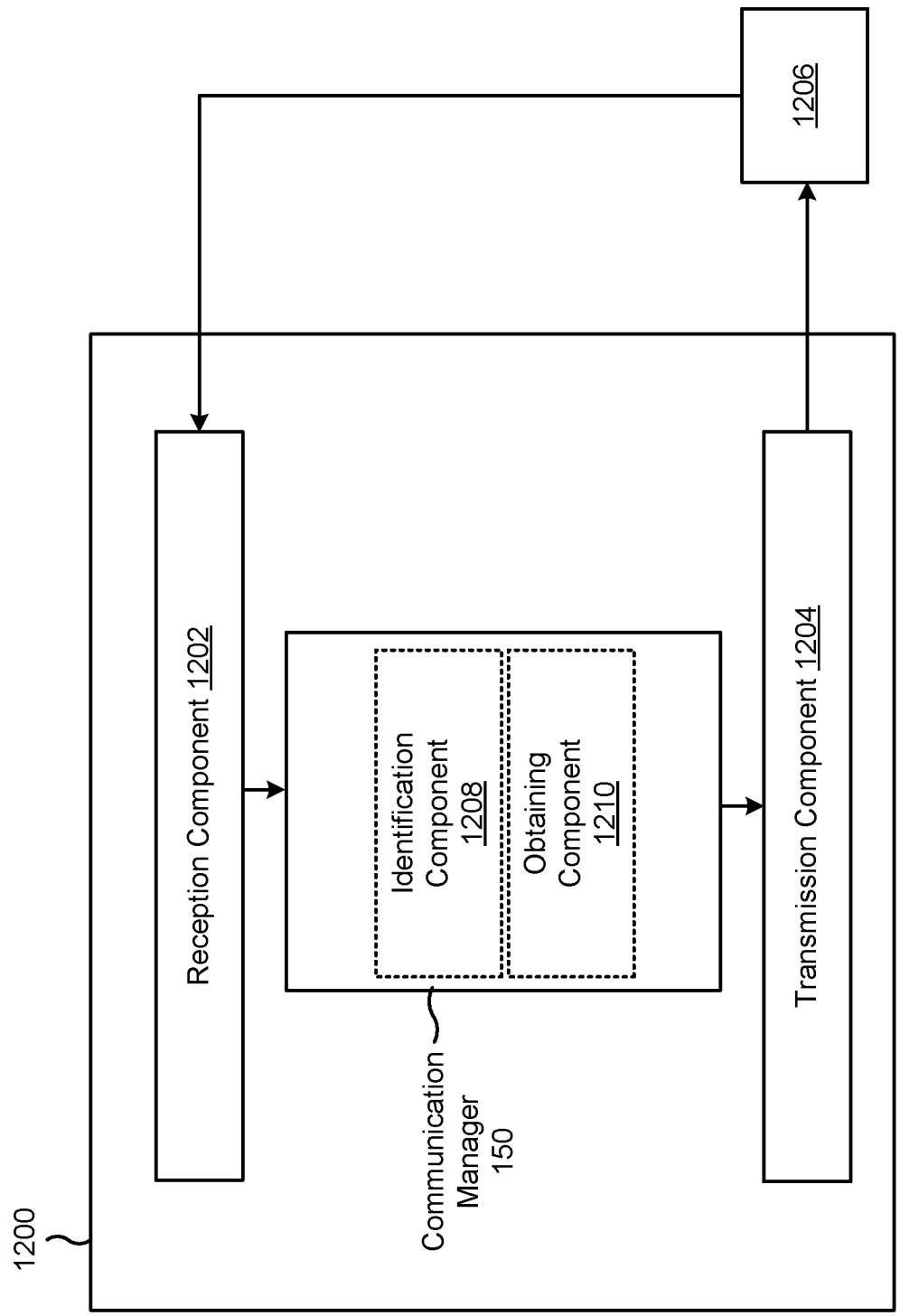
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a distributed network node, or a distributed network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of an identification component 1208 or an obtaining component 1210, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the distributed network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the distributed network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the distributed network node described in connection with FIG. 2. In some aspects, the transmission component 1204 may be co-located with the reception component 1202 in a transceiver.

The reception component 1202 may receive, from a central network node, configuration information for reporting UE positioning information or distributed network node positioning information. The identification component 1208 may identify one or more UEs based at least in part on respective connections between the one or more UEs and the distributed network node or based at least in part on measurement information. The obtaining component 1210 may obtain one or more encrypted identifiers respectively associated with the one or more UEs. The transmission component 1204 may transmit, to the central network node, the one or more encrypted identifiers in accordance with the configuration information.

The transmission component 1204 may transmit a positioning request to a UE of the one or more UEs based at least in part on transmitting the one or more encrypted identifiers to the central network node.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a central network node, configuration information for reporting UE positioning information or distributed network node positioning information; identifying one or more distributed network nodes based at least in part on respective connections between the one or more distributed network nodes and the UE or based at least in part on measurement information; obtaining one or more encrypted identifiers respectively associated with the one or more distributed network nodes; and transmitting, to the central network node, the one or more encrypted identifiers in accordance with the configuration information.

Aspect 2: The method of Aspect 1, wherein receiving the configuration information comprises receiving the configuration information from the central network node via a radio link interface, wherein obtaining the one or more encrypted identifiers comprises receiving the one or more encrypted identifiers from the one or more distributed network nodes via a sidelink interface, and wherein transmitting the one or more encrypted identifiers comprises transmitting the one or more encrypted identifiers to the central network node via the radio link interface.

Aspect 3: The method of any of Aspects 1-2, further comprising: receiving an indication that a radio link connection to the central network node for transmitting positioning information has been released, and transmitting positioning information to the one or more distributed network nodes via a sidelink interface based at least in part on the indication that the radio link connection has been released.

Aspect 4: The method of any of Aspects 1-3, wherein transmitting the one or more encrypted identifiers comprises transmitting the one or more encrypted identifiers to the central network node based at least in part on a location management function of the central network node.

Aspect 5: The method of any of Aspects 1-4, wherein identifying the one or more distributed network nodes based at least in part on the respective connections between the one or more distributed network nodes and the UE comprises identifying one or more distributed network nodes having an existing connection to the UE, and wherein identifying the one or more distributed network nodes based at least in part on the measurement information comprises identifying one or more distributed network nodes having a reference signal received power measurement that satisfies a reference signal received power measurement threshold.

Aspect 6: The method of any of Aspects 1-5, wherein obtaining the one or more encrypted identifiers respectively associated with the one or more distributed network nodes comprises: transmitting, to the one or more distributed network nodes based at least in part on the configuration information, an identification request; and receiving, from the one or more distributed network nodes based at least in part on the identification request, the one or more encrypted identifiers respectively associated with the one or more distributed network nodes.

Aspect 7: The method of any of Aspects 1-6, wherein the one or more encrypted identifiers include at least one of a subscriber concealed identifier, a globally unique temporary identifier, a general public subscription identifier, or an international mobile subscriber identity.

Aspect 8: The method of any of Aspects 1-7, wherein each encrypted identifier of the one or more encrypted identifiers is encrypted based at least in part on a shared session key between the UE and a corresponding distributed network node of the one or more distributed network nodes, or is encrypted based at least in part on a public key associated with a network that is used for communications between the UE and the corresponding distributed network node.

Aspect 9: The method of any of Aspects 1-8, wherein transmitting the one or more encrypted identifiers comprises transmitting the one or more encrypted identifiers to the central network node using non-access stratus signaling or transmitting the one or more encrypted identifiers to the central network node as assistance information in accordance with a positioning protocol.

Aspect 10: The method of any of Aspects 1-9, wherein the configuration information indicates for the UE to transmit the one or more encrypted identifiers to the central network node in accordance with an interval, and wherein transmitting the one or more encrypted identifiers to the central network node comprises transmitting the one or more encrypted identifiers to the central network node in accordance with the interval.

Aspect 11: The method of any of Aspects 1-10, wherein the configuration information indicates for the UE to transmit the one or more encrypted identifiers to the central network node based at least in part on an event, and wherein transmitting the one or more encrypted identifiers to the central network node comprises transmitting the one or more encrypted identifiers to the central network node based at least in part on an occurrence of the event.

Aspect 12: The method of Aspect 11, wherein the event is at least one of a distributed network node of the one or more distributed network nodes moving outside of a connection area associated with the UE, a distributed network node of the one or more distributed network nodes moving within the connection area associated with the UE, or a select distributed network node of the one or more distributed network nodes moving outside of the connection area of the UE or within the connection area of the UE.

Aspect 13: The method of any of Aspects 1-12, further comprising receiving a positioning request from a distributed network node of the one or more distributed network nodes based at least in part on transmitting the one or more encrypted identifiers to the central network node.

Aspect 14: The method of any of Aspects 1-13, further comprising receiving a positioning request from the central network node and a distributed network node of the one or more distributed network nodes based at least in part on transmitting the one or more encrypted identifiers to the central network node and based at least in part on an accuracy requirement.

Aspect 15: The method of any of Aspects 1-14, further comprising receiving a positioning request from the central network node and a distributed network node of the one or more distributed network nodes based at least in part on transmitting the one or more encrypted identifiers to the central network node.

Aspect 16: A method of wireless communication performed by a distributed network node, comprising: receiving, from a central network node, configuration information for reporting user equipment (UE) positioning information or distributed network node positioning information; identifying one or more UEs based at least in part on respective connections between the one or more UEs and the distributed network node or based at least in part on measurement information; obtaining one or more encrypted identifiers respectively associated with the one or more UEs; and transmitting, to the central network node, the one or more encrypted identifiers in accordance with the configuration information.

Aspect 17: The method of Aspect 16, wherein receiving the configuration information comprises receiving the configuration information from the central network node via a radio link interface, wherein obtaining the one or more encrypted identifiers comprises receiving the one or more encrypted identifiers from the one or more UEs via a sidelink interface, and wherein transmitting the one or more encrypted identifiers comprises transmitting the one or more encrypted identifiers to the central network node via the radio link interface.

Aspect 18: The method of any of Aspects 16-17, wherein transmitting the one or more encrypted identifiers comprises transmitting the one or more encrypted identifiers to the central network node based at least in part on a location management function of the central network node.

Aspect 19: The method of any of Aspects 16-18, wherein identifying the one or more UEs based at least in part on the respective connections between the one or more UEs and the distributed network node comprises identifying one or more UEs having an existing connection to the distributed network node, and wherein identifying the one or more UEs based at least in part on the measurement information comprises identifying one or more UEs having a reference signal received power measurement that satisfies a reference signal received power measurement threshold.

Aspect 20: The method of any of Aspects 16-19, wherein obtaining the one or more encrypted identifiers respectively associated with the one or more UEs comprises: transmitting, to the one or more UEs based at least in part on the configuration information, an identification request; and receiving, from the one or more UEs based at least in part on the identification request, the one or more encrypted identifiers respectively associated with the one or more UEs.

Aspect 21: The method of any of Aspects 16-20, wherein the one or more encrypted identifiers include at least one of a subscriber concealed identifier, a globally unique temporary identifier, a general public subscription identifier, or an international mobile subscriber identity.

Aspect 22: The method of any of Aspects 16-21, wherein each encrypted identifier of the one or more encrypted identifiers is encrypted based at least in part on a shared session key between the distributed network node and a corresponding UE of the one or more UEs, or is encrypted based at least in part on a public key associated with a network that is used for communications between the distributed network node and the corresponding UE.

Aspect 23: The method of any of Aspects 16-22, wherein transmitting the one or more encrypted identifiers comprises transmitting the one or more encrypted identifiers to the central network node using non-access stratus signaling or transmitting the one or more encrypted identifiers to the central network node as assistance information in accordance with a positioning protocol.

Aspect 24: The method of any of Aspects 16-23, wherein the configuration information indicates for the distributed network node to transmit the one or more encrypted identifiers to the central network node in accordance with an interval, and wherein transmitting the one or more encrypted identifiers to the central network node comprises transmitting the one or more encrypted identifiers to the central network node in accordance with the interval.

Aspect 25: The method of any of Aspects 16-24, wherein the configuration information indicates for the distributed network node to transmit the one or more encrypted identifiers to the central network node based at least in part on an event, and wherein transmitting the one or more encrypted identifiers to the central network node comprises transmitting the one or more encrypted identifiers to the central network node based at least in part on an occurrence of the event.

Aspect 26: The method of Aspect 25, wherein the event is at least one of a UE of the one or more UEs moving outside of a connection area associated with the distributed network node, a UE of the one or more UEs moving within the connection area associated with the distributed network node, or a select UE of the one or more UEs moving outside of the connection area of the distributed network node or within the connection area of the distributed network node.

Aspect 27: The method of any of Aspects 16-26, further comprising transmitting a positioning request to a UE of the one or more UEs based at least in part on transmitting the one or more encrypted identifiers to the central network node.

Aspect 28: The method of Aspect 27, wherein transmitting the positioning request to the UE comprises transmitting the positioning request to the UE based at least in part on an accuracy requirement.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a central network node, configuration information for reporting UE positioning information or distributed network node positioning information;
identify one or more distributed network nodes based at least in part on respective connections between the one or more distributed network nodes and the UE or based at least in part on measurement information;
obtain one or more encrypted identifiers respectively associated with the one or more distributed network nodes; and
transmit, to the central network node, the one or more encrypted identifiers in accordance with the configuration information.

2. The apparatus of claim 1, wherein the one or more processors, to receive the configuration information, are configured to receive the configuration information from the central network node via a radio link interface,
wherein the one or more processors, to obtain the one or more encrypted identifiers, are configured to receive the one or more encrypted identifiers from the one or more distributed network nodes via a sidelink interface, and
wherein the one or more processors, to transmit the one or more encrypted identifiers, are configured to transmit the one or more encrypted identifiers to the central network node via the radio link interface.

3. The apparatus of claim 1, wherein the one or more processors are further configured to:
receive an indication that a radio link connection to the central network node for transmitting positioning information has been released, and
transmit positioning information to the one or more distributed network nodes via a sidelink interface based at least in part on the indication that the radio link connection has been released.

4. The apparatus of claim 1, wherein the one or more processors, to transmit the one or more encrypted identifiers, are configured to transmit the one or more encrypted identifiers to the central network node based at least in part on a location management function of the central network node.

5. The apparatus of claim 1, wherein the one or more processors, to identify the one or more distributed network nodes based at least in part on the respective connections between the one or more distributed network nodes and the UE, are configured to identify one or more distributed network nodes having an existing connection to the UE, and
wherein the one or more processors, to identify the one or more distributed network nodes based at least in part on the measurement information, are configured to identify one or more distributed network nodes having a reference signal received power measurement that satisfies a reference signal received power measurement threshold.

6. The apparatus of claim 1, wherein the one or more processors, to obtain the one or more encrypted identifiers respectively associated with the one or more distributed network nodes, are configured to:
transmit, to the one or more distributed network nodes based at least in part on the configuration information, an identification request; and
receive, from the one or more distributed network nodes based at least in part on the identification request, the one or more encrypted identifiers respectively associated with the one or more distributed network nodes.

7. The apparatus of claim 1, wherein the one or more encrypted identifiers include at least one of a subscriber concealed identifier, a globally unique temporary identifier, a general public subscription identifier, or an international mobile subscriber identity.

8. The apparatus of claim 1, wherein each encrypted identifier of the one or more encrypted identifiers is encrypted based at least in part on a shared session key between the UE and a corresponding distributed network node of the one or more distributed network nodes, or is encrypted based at least in part on a public key associated with a network that is used for communications between the UE and the corresponding distributed network node.

9. The apparatus of claim 1, wherein the one or more processors, to transmit the one or more encrypted identifiers, are configured to transmit the one or more encrypted identifiers to the central network node using non-access stratus signaling or transmitting the one or more encrypted identifiers to the central network node as assistance information in accordance with a positioning protocol.

10. The apparatus of claim 1, wherein the configuration information indicates for the UE to transmit the one or more encrypted identifiers to the central network node in accordance with an interval, and wherein transmitting the one or more encrypted identifiers to the central network node comprises transmitting the one or more encrypted identifiers to the central network node in accordance with the interval.

11. The apparatus of claim 1, wherein the configuration information indicates for the UE to transmit the one or more encrypted identifiers to the central network node based at least in part on an event, and
wherein the one or more processors, to transmit the one or more encrypted identifiers to the central network node, are configured to transmit the one or more encrypted identifiers to the central network node based at least in part on an occurrence of the event.

12. The apparatus of claim 11, wherein the event is at least one of a distributed network node of the one or more distributed network nodes moving outside of a connection area associated with the UE, a distributed network node of the one or more distributed network nodes moving within the connection area associated with the UE, or a select distributed network node of the one or more distributed network nodes moving outside of the connection area of the UE or within the connection area of the UE.

13. The apparatus of claim 1, wherein the one or more processors are further configured to receive a positioning request from a distributed network node of the one or more distributed network nodes based at least in part on transmitting the one or more encrypted identifiers to the central network node.

14. The apparatus of claim 1, wherein the one or more processors are further configured to receive a positioning request from the central network node and a distributed network node of the one or more distributed network nodes based at least in part on transmitting the one or more encrypted identifiers to the central network node and based at least in part on an accuracy requirement.

15. The apparatus of claim 1, wherein the one or more processors are further configured to receive a positioning request from the central network node and a distributed network node of the one or more distributed network nodes based at least in part on transmitting the one or more encrypted identifiers to the central network node.

16. An apparatus for wireless communication at a distributed network node, comprising:
a memory; and
one or more processors, coupled to the memory, configured to:
receive, from a central network node, configuration information for reporting user equipment (UE) positioning information or distributed network node positioning information;
identify one or more UEs based at least in part on respective connections between the one or more UEs and the distributed network node or based at least in part on measurement information;
obtain one or more encrypted identifiers respectively associated with the one or more UEs; and
transmit, to the central network node, the one or more encrypted identifiers in accordance with the configuration information.

17. The apparatus of claim 16, wherein the one or more processors, to receive the configuration information, are configured to receive the configuration information from the central network node via a radio link interface,
wherein the one or more processors, to obtain the one or more encrypted identifiers, are configured to receive the one or more encrypted identifiers from the one or more UEs via a sidelink interface, and
wherein the one or more processors, to transmit the one or more encrypted identifiers, are configured to transmit the one or more encrypted identifiers to the central network node via the radio link interface.

18. The apparatus of claim 16, wherein the one or more processors, to transmit the one or more encrypted identifiers, are configured to transmit the one or more encrypted identifiers to the central network node based at least in part on a location management function of the central network node.

19. The apparatus of claim 16, wherein the one or more processors, to identify the one or more UEs based at least in part on the respective connections between the one or more UEs and the distributed network node, are configured to identify one or more UEs having an existing connection to the distributed network node, and
wherein the one or more processors, to identify the one or more UEs based at least in part on the measurement information, are configured to identify one or more UEs having a reference signal received power measurement that satisfies a reference signal received power measurement threshold.

20. The apparatus of claim 16, wherein the one or more processors, to obtain the one or more encrypted identifiers respectively associated with the one or more UEs, are configured to:
transmit, to the one or more UEs based at least in part on the configuration information, an identification request; and
receive, from the one or more UEs based at least in part on the identification request, the one or more encrypted identifiers respectively associated with the one or more UEs.

21. The apparatus of claim 16, wherein the one or more encrypted identifiers include at least one of a subscriber concealed identifier, a globally unique temporary identifier, a general public subscription identifier, or an international mobile subscriber identity.

22. The apparatus of claim 16, wherein each encrypted identifier of the one or more encrypted identifiers is encrypted based at least in part on a shared session key between the distributed network node and a corresponding UE of the one or more UEs, or is encrypted based at least in part on a public key associated with a network that is used for communications between the distributed network node and the corresponding UE.

23. The apparatus of claim 16, wherein the one or more processors, to transmit the one or more encrypted identifiers, are configured to transmit the one or more encrypted identifiers to the central network node using non-access stratus signaling or transmitting the one or more encrypted identifiers to the central network node as assistance information in accordance with a positioning protocol.

24. The apparatus of claim 16, wherein the configuration information indicates for the distributed network node to transmit the one or more encrypted identifiers to the central network node in accordance with an interval, and
wherein the one or more processors, to transmit the one or more encrypted identifiers to the central network node, are configured to transmit the one or more encrypted identifiers to the central network node in accordance with the interval.

25. The apparatus of claim 16, wherein the configuration information indicates for the distributed network node to transmit the one or more encrypted identifiers to the central network node based at least in part on an event, and
wherein the one or more processors, to transmit the one or more encrypted identifiers to the central network node, are configured to transmit the one or more encrypted identifiers to the central network node based at least in part on an occurrence of the event.

26. The apparatus of claim 25, wherein the event is at least one of a UE of the one or more UEs moving outside of a connection area associated with the distributed network node, a UE of the one or more UEs moving within the connection area associated with the distributed network node, or a select UE of the one or more UEs moving outside of the connection area of the distributed network node or within the connection area of the distributed network node.

27. The apparatus of claim 16, wherein the one or more processors are further configured to transmit a positioning request to a UE of the one or more UEs based at least in part on transmitting the one or more encrypted identifiers to the central network node.

28. The apparatus of claim 27, wherein the one or more processors, to transmit the positioning request to the UE, are configured to transmit the positioning request to the UE based at least in part on an accuracy requirement.

29. A method of wireless communication performed by a user equipment (UE), comprising:
receiving, from a central network node, configuration information for reporting UE positioning information or distributed network node positioning information;
identifying one or more distributed network nodes based at least in part on respective connections between the one or more distributed network nodes and the UE or based at least in part on measurement information;
obtaining one or more encrypted identifiers respectively associated with the one or more distributed network nodes; and
transmitting, to the central network node, the one or more encrypted identifiers in accordance with the configuration information.

30. A method of wireless communication performed by a distributed network node, comprising:

receiving, from a central network node, configuration information for reporting user equipment (UE) positioning information or distributed network node positioning information;
identifying one or more UEs based at least in part on respective connections between the one or more UEs and the distributed network node or based at least in part on measurement information;
obtaining one or more encrypted identifiers respectively associated with the one or more UEs; and
transmitting, to the central network node, the one or more encrypted identifiers in accordance with the configuration information.

* * * * *